(12) United States Patent
Mabuchi et al.

(10) Patent No.: US 7,934,763 B2
(45) Date of Patent: May 3, 2011

(54) VEHICLE SEAT APPARATUS

(75) Inventors: Teiji Mabuchi, Aichi-ken (JP); Osamu Fujimoto, Nissin (JP); Kei Matsui, Toyota (JP); Yoshihiro Suda, Tokyo-to (JP); Yoshihiko Tabuchi, Nishinomiya (JP); Shoichiro Takehara, Yokohama (JP); Daisuke Yamaguchi, Tokyo-to (JP); Takaaki Koga, Tokyo-to (JP)

(73) Assignees: Toyota Jidosha Kabushiki Kaisha, Toyota-shi, Aichi-ken (JP); The University of Tokyo, Tokyo (JP)

( * ) Notice: Subject to any disclaimer, the term of this patent is extended or adjusted under 35 U.S.C. 154(b) by 60 days.

(21) Appl. No.: 12/339,561

(22) Filed: Dec. 19, 2008

(65) Prior Publication Data

US 2009/0160229 A1 Jun. 25, 2009

(30) Foreign Application Priority Data

Dec. 21, 2007 (JP) ................................ 2007-330980

(51) Int. Cl.
*B60J 7/00* (2006.01)
(52) U.S. Cl. ............. 296/65.07; 296/65.01; 297/344.21; 297/344.23
(58) Field of Classification Search ............... 296/65.01, 296/65.06, 65.07, 65.08, 65.12, 65.15, 65.17, 296/65.18; 297/244.21, 344.23, 344.21; 701/49

See application file for complete search history.

(56) References Cited

U.S. PATENT DOCUMENTS

| 4,802,706 | A | * | 2/1989 | Onimaru et al. | ................ | 296/68 |
| 5,822,707 | A | * | 10/1998 | Breed et al. | ...................... | 701/49 |
| 7,121,608 | B2 | * | 10/2006 | Billger et al. | ............... | 296/65.06 |
| 7,648,186 | B2 | * | 1/2010 | Ukai et al. | .................. | 296/65.06 |
| 2007/0284905 | A1 | * | 12/2007 | Bailey | ........................ | 296/65.07 |

FOREIGN PATENT DOCUMENTS

| DE | 197 35 504 | | 2/1999 |
| DE | 100 12 035 | | 9/2001 |
| DE | 10 2007 000 182 | | 10/2007 |
| EP | 1 693 245 A2 | | 8/2006 |
| JP | 7-79834 | | 3/1995 |
| JP | 7-215113 | | 8/1995 |
| JP | 2000-40148 | | 2/2000 |
| JP | 2002-337619 | | 11/2002 |
| JP | 2007-313969 | | 12/2007 |
| JP | 2007-320446 | | 12/2007 |
| JP | 2007-320447 | | 12/2007 |

OTHER PUBLICATIONS

Office Action from the German Patent Office dated Jan. 21, 2011 for German Application No. 10 2008 055 553.3-14.

* cited by examiner

*Primary Examiner* — Joseph D Pape
(74) *Attorney, Agent, or Firm* — Finnegan, Henderson, Farabow, Garrett & Dunner, LLP

(57) ABSTRACT

A vehicle seat apparatus includes a vehicle seat; a swiveling drive unit that swivels the vehicle seat between a frontward-oriented position in which the vehicle seat faces the front of a vehicle and at least one of an outward-oriented position in which the vehicle seat is oriented in the outward direction of the vehicle and an inward-oriented position in which the vehicle seat is oriented in the inward direction of the vehicle; an occupant condition detection unit that detects the condition of an occupant in the vehicle; and a control unit that controls the swiveling drive unit based on the detection result obtained by the occupant condition detection unit. With this configuration, it is possible to further increase the comfort of a passenger compartment based on the condition of the occupants in the vehicle.

34 Claims, 11 Drawing Sheets

<ATMOSPHERE DETECTION MODE>

<SLEEPINESS DETECTION MODE>

<PHYSICAL CONDITION DETECTION MODE>

<PASSENGER COMPARTMENT OUTSIDE
COMMUNICATION DETECTION MODE>

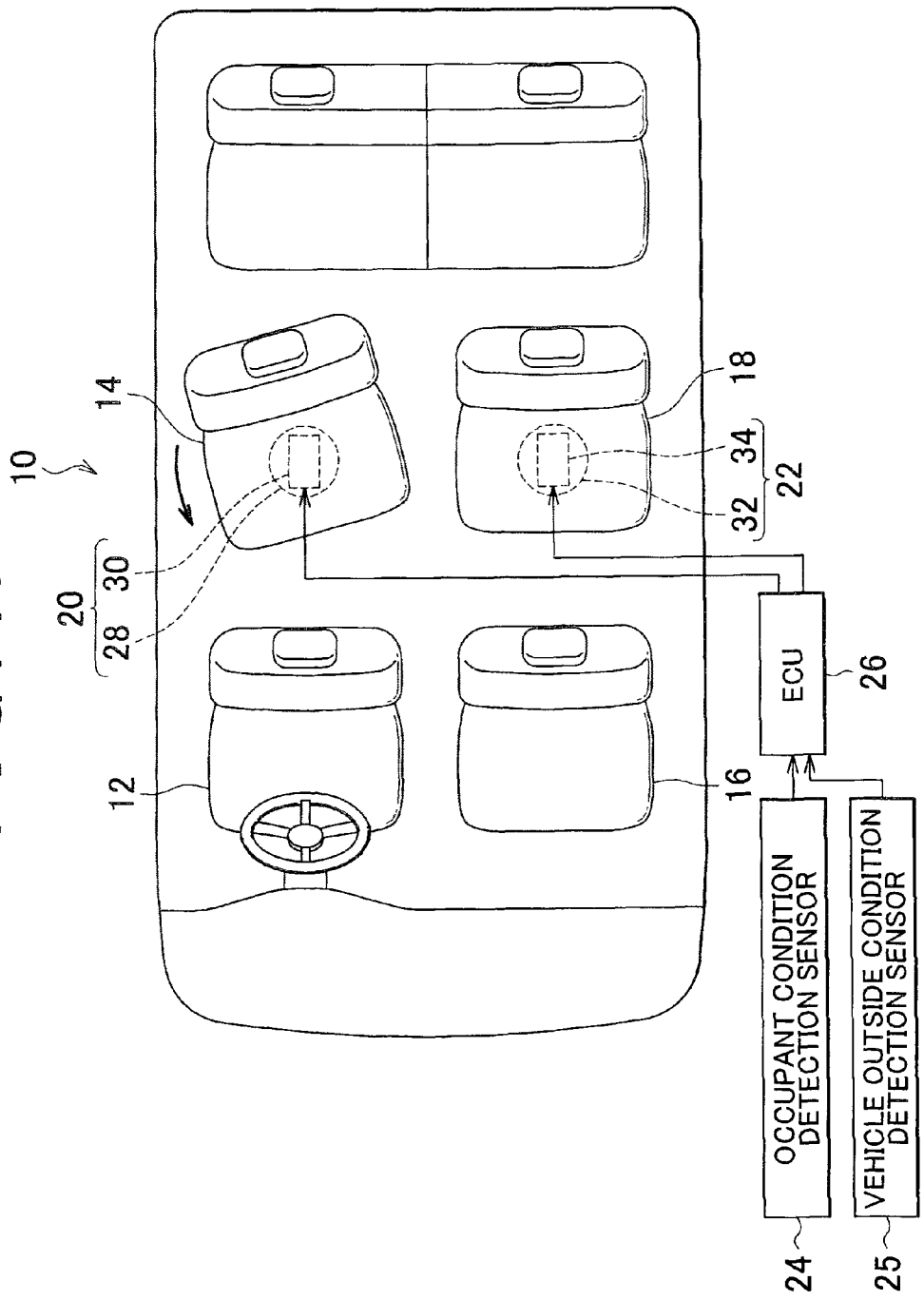

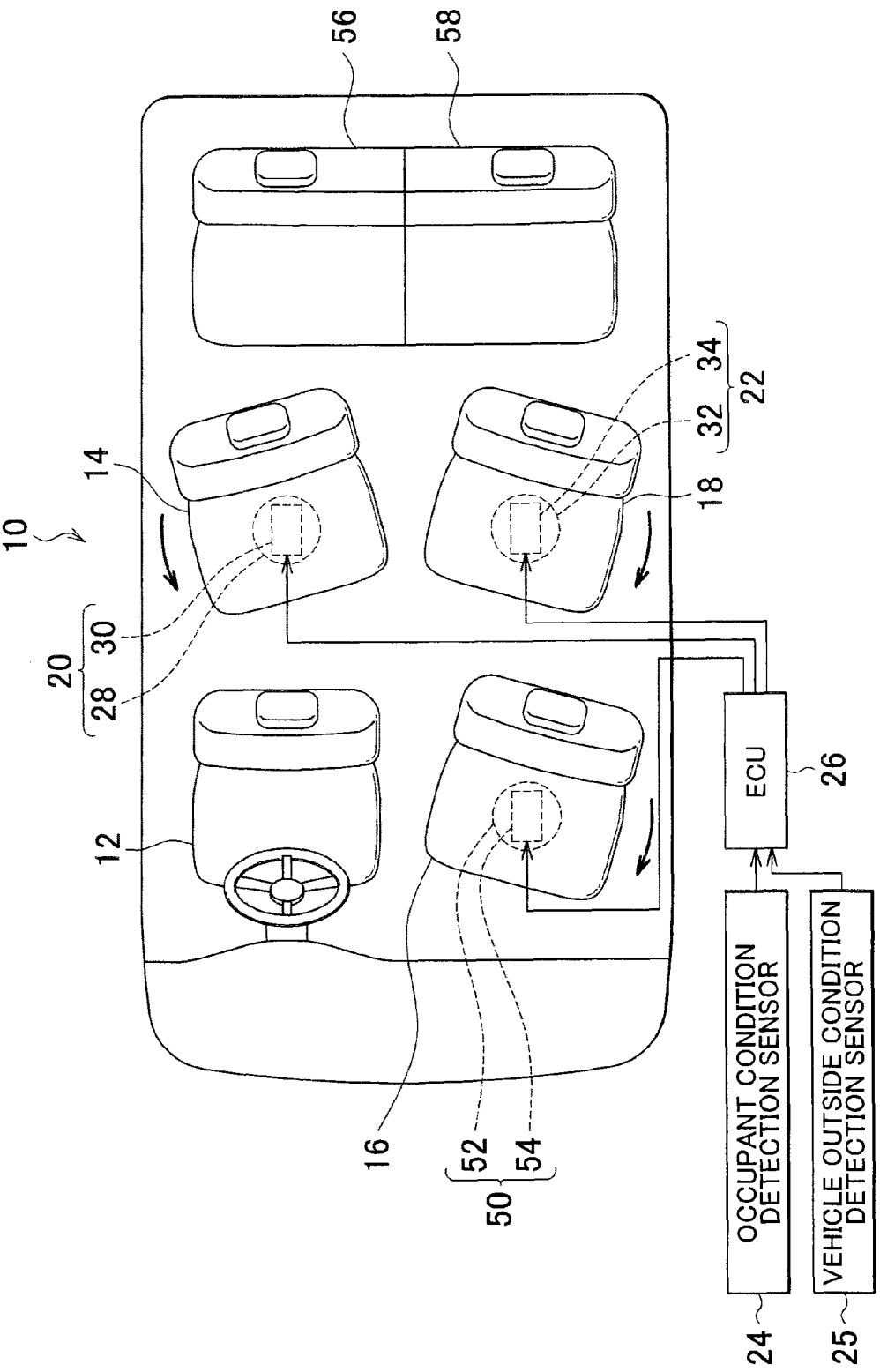

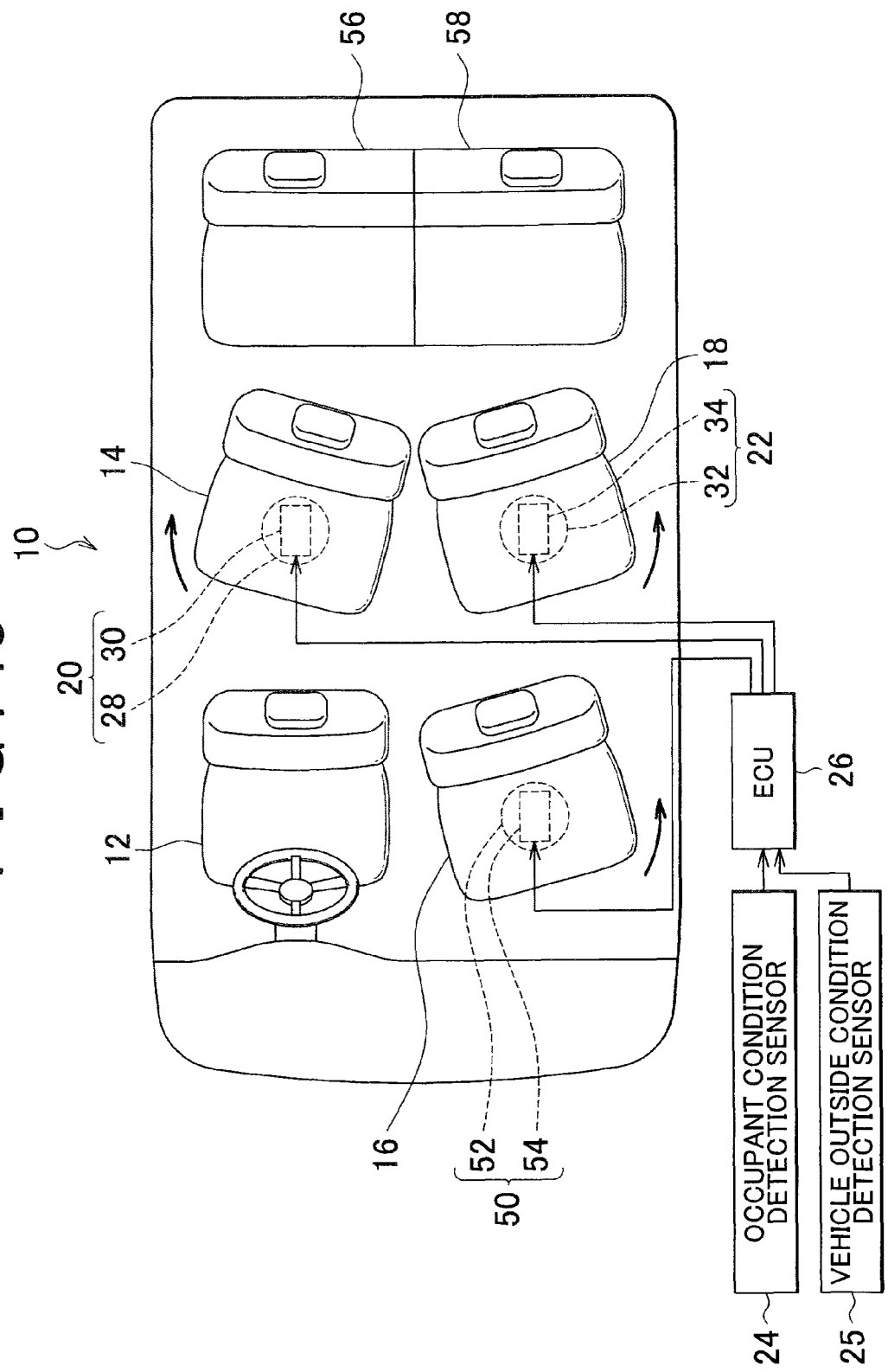

VEHICLE SEAT APPARATUS

INCORPORATION BY REFERENCE

The disclosure of Japanese Patent Application No. 2007-330980 filed on Dec. 21, 2007 including the specification, drawings and abstract is incorporated herein by reference in its entirety.

BACKGROUND OF THE INVENTION

1. Field of the Invention

The invention relates generally to a vehicle seat apparatus, and, more specifically to a vehicle seat apparatus that allows a vehicle seat to swivel with respect to a vehicle floor.

2. Description of the Related Art

Vehicle seat apparatuses of this type are described in Japanese Patent Application Publication No. 7-215113 (JP-A-7-215113) and Japanese Patent Application Publication No. 2002-337619 (JP-A-2002-337619). With an automobile seat apparatus described in JP-A-7-215113, an automobile seat in the second row is allowed to swivel around to face an automobile seat in the third row in a passenger compartment.

European Patent Application Publication No. 1693245 describes a seat apparatus with which seats in the second row are allowed to swivel inward in a passenger compartment to face each other. Japanese Patent Application Publication No. 2000-40148 (JP-A-2000-40148) describes a technology for determining the arousal level --of a driver based on an image of the driver.

However, in an example described in JP-A-7-215113, in order to swivel the automobile seat in the second row around to face the automobile seat in the third row, a cumbersome operation, for example, manually swiveling the automobile seat in the second row, is required. Therefore, there is still room for improvement in enhancing the usability of an automobile seat to further increase the comfort of a passenger compartment.

SUMMARY OF THE INVENTION

The invention is made in light of the above-described circumstances. The invention provides a vehicle seat apparatus with which the comfort of a passenger compartment is further increased.

A first aspect of the invention relates to a vehicle seat apparatus that includes: a vehicle seat; a swiveling drive unit that swivels the vehicle seat between a frontward-oriented position in which the vehicle seat faces the front of a vehicle and at least one of an outward-oriented position in which the vehicle seat is oriented in the outward direction of the vehicle and an inward-oriented position in which the vehicle seat is oriented in the inward direction of the vehicle; an occupant condition detection unit that detects the condition of an occupant in the vehicle; and a control unit that controls the swiveling drive unit based on the detection result obtained by the occupant condition detection unit.

With the vehicle seat apparatus described above, the occupant condition detection unit detects the condition of the occupant in the vehicle. Then, the control unit controls the swiveling drive unit based on the detection result obtained by the occupant condition detection unit so that the vehicle seat is automatically swiveled to the outward-oriented position or the inward-oriented position. Thus, the usability of the vehicle seat is enhanced. As a result, it is possible to further increase the comfort of a passenger compartment.

In the vehicle seat apparatus described above, the swiveling drive unit may be able to swivel the vehicle seat toward the outward-oriented position, the occupant condition detection unit may detect the condition of communication between an occupant seated in the vehicle seat and a person outside the vehicle, and the control unit may control the swiveling drive unit so that the vehicle seat is swiveled toward the outward-oriented position when the control unit determines that the occupant seated in the vehicle seat is communicating with a person outside the vehicle based on the detection result obtained by the occupant condition detection unit.

With the vehicle seat apparatus described above, the occupant condition detection unit detects the condition of communication between the occupant seated in the vehicle seat and a person outside the vehicle. When the control unit determines that the occupant seated in the vehicle seat is communicating with a person outside the vehicle based on the detection result obtained by the occupant condition detection unit, the control unit controls the swiveling drive unit so that the vehicle seat is automatically swiveled toward the outward-oriented position. Thus, the occupant seated in the vehicle seat and the person outside the vehicle can communicate with each other more easily.

In the vehicle seat apparatus described above, the swiveling drive unit may be able to swivel the vehicle seat toward the inward-oriented position, the occupant condition detection unit may detect the condition of communication between the occupant seated in the vehicle seat and another occupant in the vehicle, and the control unit may control the swiveling drive unit so that the vehicle seat is swiveled toward the inward-oriented position when the control unit determines that the occupant seated in the vehicle seat is communicating with the other occupant in the vehicle based on the detection result obtained by the occupant condition detection unit.

With the vehicle seat apparatus described above, the occupant condition detection unit detects the condition of communication between the occupant seated in the vehicle seat and another occupant in the vehicle. Then, when the control unit determines that the occupant seated in the vehicle seat communicates with the other occupant based on the detection result obtained by the occupant condition detection unit, the control unit controls the swiveling drive unit so that the vehicle seat is automatically swiveled toward the inward-oriented position. Thus, the occupants can communicate with each other more easily.

In the vehicle seat apparatus described above, the swiveling drive unit may be able to swivel the vehicle seat toward the outward-oriented position, and the control unit may control the swiveling drive unit so that the vehicle seat is swiveled toward the outward-oriented position when the control unit determines that the occupant seated in the vehicle seat is not communicating with the other occupant in the vehicle based on the detection result obtained by the occupant condition detection unit.

With the vehicle seat apparatus described above, even when the control unit once determines that the occupant seated in the vehicle seat is communicating with another occupant and therefore the vehicle seat is swiveled toward the inward-oriented position, if the control unit determines later that these occupants are not communicating with each other, the control unit controls the swiveling drive unit so that the vehicle seat is automatically swiveled toward the outward-oriented position. Thus, a personal space (for example, a space useful for the occupant to relax or to enjoy scenery seen from a window) is created for the occupants seated in the vehicle seat.

In the vehicle seat apparatus described above, the swiveling drive unit may be able to swivel the vehicle seat toward the outward-oriented position, the occupant condition detection unit may detect whether a personal space needs to be provided to the occupant seated in the vehicle seat, and the control unit may control the swiveling drive unit so that the vehicle seat is swiveled toward the outward-oriented position when the control unit determines that a personal space needs to be provided to the occupant seated in the vehicle seat based on the detection result obtained by the occupant condition detection unit.

With the vehicle seat apparatus described above, the occupant condition detection unit detects whether a personal space needs to be provided to the occupant seated in the vehicle seat. When the control unit determines that a personal space needs to be provided to the occupant seated in the vehicle seat based on the detection result obtained by the occupant condition detection unit, the control unit controls the swiveling drive unit so that the vehicle seat is automatically swiveled toward the outward-oriented position. Thus, the occupant seated in the vehicle seat is provided with a personal space.

In the vehicle seat apparatus described above, the occupant condition detection unit may detect the arousal level of the occupant seated in the vehicle seat, and the control unit may control the swiveling drive unit so that the vehicle seat is swiveled toward the outward-oriented position when the control unit determines that the arousal level of the occupant seated in the vehicle seat has been decreased based on the detection result obtained by the occupant condition detection unit.

With the vehicle seat apparatus described above, the occupant condition detection unit detects the arousal level of the occupant seated in the vehicle seat. Then, the control unit controls the swiveling drive unit so that the vehicle seat is automatically swiveled toward the outward-oriented position when the control unit determines that the arousal level of the occupant seated in the vehicle seat has been decreased based on the detection result obtained by the occupant condition detection unit. Thus, it is possible to provide the occupant seated in the vehicle seat with a personal space, that is, an environment in which the occupant can take a nice sleep.

In the vehicle seat apparatus described above, the occupant condition detection unit may detect the physical condition of the occupant seated in the vehicle seat, and the control unit may control the swiveling drive unit so that the vehicle seat is swiveled toward the outward-oriented position when the control unit determines that the occupant seated in the vehicle seat feels sick based on the detection result obtained by the occupant condition detection unit.

With the vehicle seat apparatus described above, the occupant condition detection unit detects the physical condition of the occupant seated in the vehicle seat. Then, when the control unit determines that the occupant seated in the vehicle seat feels sick based on the detection result obtained by the occupant condition detection unit, the control unit controls the swiveling drive unit so that the vehicle seat is automatically swiveled toward the outward-oriented position. Thus, it is possible to provide the occupant seated in the vehicle seat with a personal space, that is, an environment in which this occupant can easily look out of the window to feel better.

In the vehicle seat apparatus described above, the occupant condition detection unit may detect whether at least one occupant in the vehicle is smoking, and the control unit may control the swiveling drive unit so that the vehicle seat is swiveled toward the outward-oriented position when the control unit determines that an occupant in the vehicle is smoking based on the detection result obtained by the occupant condition detection unit.

With the vehicle seat apparatus described above, the occupant condition detection unit detects whether at least one occupant in the vehicle is smoking. Then, when the control unit determines that an occupant in the vehicle is smoking based on the detection result obtained by the occupant condition detection unit, the control unit controls the swiveling drive unit so that the vehicle seat is automatically swiveled toward the outward-oriented position. Thus, the occupant seated in the vehicle seat is provided with a personal space. For example, when the occupant seated in the vehicle seat is smoking, smoke does not flow toward the other occupants and the smoke is discharged to the outside of the passenger compartment through the window. When an occupant other than the occupant seated in the vehicle seat is smoking, the occupant seated in the vehicle seat is kept away from the smoke.

In the vehicle seat apparatus described above, the occupant condition detection unit may detect whether occupants in the vehicle are quarreling, and the control unit may control the swiveling drive unit so that the vehicle seat is swiveled toward the outward-oriented position when the control unit determines that the occupants in the vehicle are quarreling based on the detection result obtained by the occupant condition detection unit.

With the vehicle seat apparatus described above, the occupant condition detection unit detects whether the occupants in the vehicle are quarreling. Then, when the control unit determines that the occupants are quarreling based on the detection result obtained by the occupant condition detection unit, the control unit controls the swiveling drive unit so that the vehicle seat is automatically swiveled toward the outward-oriented position. Thus, the occupant seated in the vehicle seat is provided with a personal space. As a result, for example, when the occupant seated in the vehicle seat is quarreling with another occupant, it is possible to smooth over a quarrel between the occupant who is seated in the vehicle seat and the other occupant. When occupants other than the occupant seated in the vehicle seat are quarreling, it is possible to prevent the occupant seated in the vehicle seat from being annoyed with the quarrel.

In the vehicle seat apparatus described above, the occupant condition detection unit may detect whether the occupant seated in the vehicle seat has a meal alone, and the control unit may control the swiveling drive unit so that the vehicle seat is swiveled toward the outward-oriented position when the control unit determines that the occupant seated in the vehicle seat has a meal alone based on the detection result obtained by the occupant condition detection unit.

With the vehicle seat apparatus described above, the occupant condition detection unit detects whether the occupant seated in the vehicle seat has a meal alone. When the control unit determines that the occupant seated in the vehicle seat has a meal alone based on the detection result obtained by the occupant condition detection unit, the control unit controls the swiveling drive unit so that the vehicle seat is automatically swiveled toward the outward-oriented position. Thus, it is possible to provide the occupant seated in the vehicle seat with a personal space. As a result, this occupant can have a meal alone without worrying about the other occupants.

In the vehicle seat apparatus described above, the occupant condition detection unit may detect whether the occupant seated in the vehicle seat is using a cellular phone, and the control unit may control the swiveling drive unit so that the vehicle seat is swiveled toward the outward-oriented position when the control unit determines that the occupant seated in the vehicle seat is using the cellular phone based on the detection result obtained by the occupant condition detection unit.

With the vehicle seat apparatus described above, the occupant condition detection unit detects whether the occupant seated in the vehicle seat is using the cellular phone. Then, when the control unit determines that the occupant seated in the vehicle seat is using the cellular phone based on the detection result obtained by the occupant condition detection unit, the control unit controls the swiveling drive unit so that the vehicle seat is automatically swiveled toward the outward-oriented position. Thus, it is possible to provide the occupant seated in the vehicle seat with a personal space. As a result, the occupant seated in the vehicle seat can use the cellular phone without worrying about the other occupants.

The vehicle seat apparatus described above may further include vehicle outside condition detection unit for detecting the condition outside the vehicle. The swiveling drive unit may be able to swivel the vehicle seat toward the inward-oriented position, and the control unit may control the swiveling drive unit so that the vehicle seat is swiveled from the frontward-oriented position or the outward-oriented position toward the inward-oriented position when the control unit determines that the condition outside the vehicle is unsuitable for maintaining the vehicle seat in the frontward-oriented position or the outward-oriented position based on the detection result obtained by the vehicle outside condition detection unit.

With the vehicle seat apparatus described above, the vehicle outside condition detection unit detects the condition outside the vehicle. When the control unit determines that the condition outside the vehicle is unsuitable for maintaining the vehicle seat in the frontward-oriented position or the outward-oriented position based on the detection result obtained by the vehicle outside condition detection unit, the control unit controls the swiveling drive unit so that the vehicle seat is automatically swiveled from the frontward-oriented position or the outward-oriented position toward the inward-oriented position. Thus, the occupants can communicate with each other more easily.

In the vehicle seat apparatus described above, the vehicle outside condition detection unit may detect whether it is noisy outside the vehicle, and the control unit may control the swiveling drive unit so that the vehicle seat is swiveled from the frontward-oriented position or the outward-oriented position toward the inward-oriented position when the control unit determines that it is noisy outside the vehicle based on the detection result obtained by the vehicle outside condition detection unit.

With the vehicle seat apparatus described above, when the control unit determines that it is noisy outside the vehicle, the control unit controls the swiveling drive unit so that the vehicle seat is automatically swiveled from the frontward-oriented position or the outward-oriented position toward the inward-oriented position. Thus, even when it is noisy outside the vehicle, the occupants can communicate with each other more easily.

In the vehicle seat apparatus described above, the vehicle outside condition detection unit may detect whether the vehicle is traveling in a daytime or at night, and the control unit may control the swiveling drive unit so that the vehicle seat is swiveled from the frontward-oriented position or the outward-oriented position toward the inward-oriented position when the control unit determines that the vehicle is traveling at night based on the detection result obtained by the vehicle outside condition detection unit.

With the vehicle seat apparatus described above, when the control unit determines the vehicle is traveling at night, the control unit controls the swiveling drive unit so that the vehicle seat is automatically swiveled from the frontward-oriented position or the outward-oriented position toward the inward-oriented position. Thus, when night falls, communication between the occupants is promoted.

In the vehicle seat apparatus described above, the vehicle outside condition detection unit may detect brightness outside the vehicle, and the control unit may control the swiveling drive unit so that the vehicle seat is swiveled from the frontward-oriented position or the outward-oriented position toward the inward-oriented position when the control unit determines that the brightness outside the vehicle is equal to or lower than a predetermined reference value based on the detection result obtained by the vehicle outside condition detection unit.

With the vehicle seat apparatus described above, when the control unit determines that the brightness outside the vehicle is equal to or lower than the predetermined reference value based on the detection result obtained by the vehicle outside condition detection unit, the control unit controls the swiveling drive unit so that the vehicle seat is automatically swiveled from the frontward-oriented position or the outward-oriented position toward the inward-oriented position. Thus, when it gets dark outside the vehicle, communication between the occupants is promoted.

In the vehicle seat apparatus described above, the swiveling drive unit may be able to swivel the vehicle seat toward the inward-oriented position, the occupant condition detection unit may detect whether the occupant seated in the vehicle seat has a meal alone, and the control unit may control the swiveling drive unit so that the vehicle seat is swiveled toward the inward-oriented position when the control unit determines that the occupant seated in the vehicle seat has a meal with another occupant in the vehicle based on the detection result obtained by the occupant condition detection unit.

With the vehicle seat apparatus described above, the occupant condition detection unit detects whether the occupant seated in the vehicle seat has a meal alone. When the control unit determines that the occupant seated in the vehicle seat has a meal with another occupant based on the detection result obtained by the occupant condition detection unit, the control unit controls the swiveling drive unit so that the vehicle seat is automatically swiveled toward the inward-oriented position. Thus, the occupant seated in the vehicle seat can have a meal with the other occupant in the vehicle easily.

In the vehicle seat apparatus described above, the swiveling drive unit may be able to swivel the vehicle seat toward the inward-oriented position, the occupant condition detection unit may detect the condition of an occupant seated in a child seat that is attached to a seat other than the vehicle seat, and the control unit may control the swiveling drive unit so that the vehicle seat is swiveled toward the inward-oriented position when the control unit determines that the vehicle seat needs to be swiveled toward the inward-oriented position based on the detection result obtained by the occupant condition detection unit.

With the vehicle seat apparatus described above, the occupant condition detection unit detects the condition of the occupant seated in the child seat that is attached to the seat other than the vehicle seat. Then, when the control unit determines that the vehicle seat needs to be swiveled toward the inward-oriented position based on the detection result obtained by the occupant condition detection unit, the control unit controls the swiveling drive unit so that the vehicle seat is automatically swiveled toward the inward-oriented position. Thus, it is possible to more easily access the occupant seated in the vehicle seat.

A second aspect of the invention relates to a vehicle seat apparatus including: at least a pair of vehicle seats arranged next to each other in the width-direction of a vehicle; a swiveling drive unit that swivels at least one of the pair of vehicle seats between a frontward-oriented position in which the vehicle seat faces the front of the vehicle and at least one of an outward-oriented position in which the vehicle seat is oriented in the outward direction of the vehicle and an inward-oriented position in which the vehicle seat is oriented in the inward direction of the vehicle; an occupant condition detection unit for detecting the condition of an occupant in the vehicle; and a control unit that controls the swiveling drive unit based on the detection result obtained by the occupant condition detection unit.

With the vehicle seat apparatus described above, the occupant condition detection unit detects the condition of the occupant in the vehicle. Then, the control unit controls the swiveling drive unit based on the detection result obtained by the occupant condition detection unit so that the vehicle seat is automatically swiveled to the outward-oriented position or the inward-oriented position. Thus, the usability of the vehicle seat is enhanced. As a result, it is possible to further increase the comfort of the passenger compartment.

In the vehicle seat apparatus described above, the swiveling drive unit may be able to swivel at least one of the pair of vehicle seats toward the outward-oriented position, and the occupant condition detection unit may detect the condition of communication between an occupant seated in one of the pair of vehicle seats and a person outside the vehicle. When the control unit determines that the occupant seated in one of the pair of vehicle seats is communicating with a person outside the vehicle based on the detection result obtained by the occupant condition detection unit, the control unit may control the swiveling drive unit so that the vehicle seat occupied by the occupant who is communicating with the person outside vehicle seat is swiveled toward the outward-oriented position.

With the vehicle seat apparatus described above, the occupant condition detection unit detects the condition of communication between the occupant seated in one of the pair of vehicle seat and a person outside the vehicle. When the control unit determines that the occupant seated in one of the pair of vehicle seats is communicating with a person outside the vehicle based on the detection result obtained by the occupant condition detection unit, the control unit controls the swiveling drive unit so that the vehicle seat occupied by the occupant who is communicating with the person outside the vehicle is automatically swiveled toward the outward-oriented position. Thus, the occupant who is seated in one of the vehicle seats can communicate with the person outside the vehicle more easily.

In the vehicle seat apparatus described above, the swiveling drive unit may be able to swivel at least one of the pair of vehicle seats toward the inward-oriented position, and the occupant condition detection unit may detect the condition of communication between occupants seated in the pair of vehicle seats. When the control unit determines that the occupants seated in the pair of vehicle seats are communicating with each other based on the detection result obtained by the occupant condition detection unit, the control unit may control the swiveling drive unit so that at least one of the pair of vehicle seats is swiveled toward the inward-oriented position.

With the vehicle seat apparatus described above, the occupant condition detection unit detects the condition of communication between the occupants seated in the pair of vehicle seats. When the control unit determines that the occupants seated in the pair of vehicle seats are communicating with each other based on the detection result obtained by the occupant condition detection unit, the control unit controls the swiveling drive unit so that at least one of the pair of vehicle seats is automatically swiveled toward the inward-oriented position. Thus, the occupants seated in the pair of vehicle seats can communicate with each other more easily.

In the vehicle seat apparatus described above, the swiveling drive unit may be able to swivel at least one of the pair of vehicle seats toward the outward-oriented position. When the control unit determines that the occupants seated in the pair of vehicle seats are not communicating with each other based on the detection result obtained by the occupant condition detection unit, the control unit may control the swiveling drive unit so that at least one of the pair of vehicle seats is swiveled toward the outward-oriented position.

With the vehicle seat apparatus described above, even when the control unit once determines that the occupants seated in the pair of vehicle seats are communicating with each other and therefore at least one of the vehicle seats is swiveled toward the inward-oriented position, if the control unit determines later that these occupants are not communicating with each other, the control unit controls the swiveling drive unit so that at least one of the pair of vehicle seats is automatically swiveled toward the outward-oriented position. Thus, a personal space (for example, a space useful for the occupant to relax or to enjoy scenery seen from a window) is created for at least one of the occupants seated in the pair of vehicle seats.

In the vehicle seat apparatus described above, the swiveling drive unit may be able to swivel at least one of the pair of vehicle seats toward the outward-oriented position, and the occupant condition detection unit may detect whether a personal space needs to be provided to the occupant seated in one of the pair of vehicle seats. When the control unit determines based on the detection result obtained by the occupant condition detection unit that a personal space needs to be provided to the occupant seated in one of the pair of vehicle seats, the control unit may control the swiveling drive unit so that the vehicle seat occupied by the occupant who needs to be provided with a personal space is swiveled toward the outward-oriented position.

With the vehicle seat apparatus described above, the occupant condition detection unit detects whether a personal space needs to be provided to the occupant seated in one of the pair of vehicle seats. When the control unit determines based on the detection result obtained by the occupant condition detection unit that a personal space needs to be provided to the occupant seated in one of the pair of vehicle seats, the control unit controls the swiveling drive unit so that the vehicle seat occupied by the occupant who needs to be provided with a personal space is swiveled toward the outward-oriented position. Thus, it is possible to provide a personal space to the occupant seated in one of the pair of vehicle seats.

In the vehicle seat apparatus described above, the occupant condition detection unit may detect the arousal level of the occupant seated in one of the pair of vehicle seats. When the control unit determines that the arousal level of the occupant seated in one of the pair of vehicle seats has been decreased based on the detection result obtained by the occupant condition detection unit, the control unit may control the swiveling drive unit so that the vehicle seat occupied by the occupant who feels sleepy is swiveled toward the outward-oriented position.

With the vehicle seat apparatus described above, the occupant condition detection unit detects the arousal level of the occupant seated in one of the pair of vehicle seats. When the control unit determines that the arousal level of the occupant seated in one of the pair of vehicle seats has been decreased based on the detection result obtained by the occupant condition detection unit, the control unit controls the swiveling drive unit so that the vehicle seat occupied by the occupant who feels sleepy is automatically swiveled toward the outward-oriented position. Thus, it is possible to provide the occupant who is seated in one of the pair of vehicle seats and feels sleepy with a personal space, that is, an environment in which this occupant can take a nice sleep.

In the vehicle seat apparatus described above, the occupant condition detection unit may detect the physical condition of the occupant seated in one of the pair of vehicle seats. When the control unit determines that the occupant seated in one of the pair of vehicle seats feels sick based on the detection result obtained by the occupant condition detection unit, the control unit may control the swiveling drive unit so that the vehicle seat occupied by the occupant who feels sick is swiveled toward the outward-oriented position.

With the vehicle seat apparatus described above, the occupant condition detection unit detects the physical condition of the occupant seated in one of the pair of vehicle seats. Then, when the control unit determines that the occupant seated in one of the pair of vehicle seats feels sick based on the detection result obtained by the occupant condition detection unit, the control unit controls the swiveling drive unit so that the vehicle seat occupied by the occupant who feels sick is automatically swiveled toward the outward-oriented position. Thus, it is possible to provide the occupant who is seated in one of the pair of vehicle seats and feels sick with a personal space, that is, an environment in which this occupant can easily look out of the window to feel better.

In the vehicle seat apparatus described above, the occupant condition detection unit may detect whether at least one occupant in the vehicle is smoking. When the control unit determines that an occupant in the vehicle is smoking based on the detection result obtained by the occupant condition detection unit, the control unit may control the swiveling drive unit so that at least one of the pair of vehicle seats is swiveled toward the outward-oriented position.

With the vehicle seat apparatus described above, the occupant condition detection unit detects whether at least one occupant in the vehicle is smoking. When the control unit determines that an occupant in the vehicle is smoking based on the detection result obtained by the occupant condition detection unit, the control unit controls the swiveling drive unit so that at least one of the pair of vehicle seats is automatically swiveled toward the outward-oriented position. Thus, the occupant seated in one of the pair of vehicle seats is provided with a personal space. For example, when the occupant seated in one of the pair of vehicle seats is smoking, smoke does not flow toward the other occupants and smoke is discharged to the outside of the passenger compartment through the window. When an occupant other than the occupants seated in the pair of vehicle seats is smoking, the occupant seated in one of the pair of vehicle seats is kept away from the smoke.

In the vehicle seat apparatus described above, the occupant condition detection unit may detect whether occupants in the vehicle are quarreling, and when the control unit determines that the occupants in the vehicle are quarreling based on the detection result obtained by the occupant condition detection unit, the control unit may control the swiveling drive unit so that at least one of the pair of vehicle seats is swiveled toward the outward-oriented position.

With the vehicle seat apparatus described above, the occupant condition detection unit detects whether the occupants in the vehicle are quarreling. When the control unit determines that the occupants in the vehicle are quarreling based on the detection result obtained by the occupant condition detection unit, the control unit controls the swiveling drive unit so that at least one of the pair of vehicle seats is automatically swiveled toward the outward-oriented position. Thus, it is possible to provide the occupant seated in one of the pair of vehicle seats with a personal space. As a result, for example, when the occupant seated in one of the pair of vehicle seats is quarreling with another occupant, it is possible to smooth over the quarrel. When occupants other than the occupants seated in the pair of vehicle seats are quarreling, it is possible to prevent the occupant seated the one of the pair of vehicle seats from being annoyed with the quarrel.

In the vehicle seat apparatus described above, the occupant condition detection unit may detect whether the occupant seated in one of the pair of vehicle seats has a meal alone, and when the control unit determines that the occupant seated in one of the pair of vehicle seats has a meal alone based on the detection result obtained by the occupant condition detection unit, the control unit may control the swiveling drive unit so that the vehicle seat which is occupied by the occupant who has a meal alone is swiveled toward the outward-oriented position.

With the vehicle seat apparatus described above, the occupant condition detection unit detects whether the occupant seated in one of the pair of vehicle seats has a meal alone. When the control unit determines that the occupant seated in one of the pair of vehicle seats has a meal alone based on the detection result obtained by the occupant condition detection unit, the control unit controls the swiveling drive unit so that the vehicle seat occupied by the occupant who has a meal alone is automatically swiveled toward the outward-oriented position. Thus, it is possible to provide the occupant who is seated in one of the pair of vehicle seats and has a meal alone with a personal space. As a result, this occupant can have a meal alone without worrying about the other occupants.

In the vehicle seat apparatus described above, the occupant condition detection unit may detect whether the occupant seated in one of the pair of vehicle seats is using a cellular phone. When the control unit determines that the occupant seated in one of the pair of vehicle seats is using the cellular phone based on the detection result obtained by the occupant condition detection unit, the control unit may control the swiveling drive unit so that the vehicle seat which is occupied by the occupant who is using the cellular phone is swiveled toward the outward-oriented position.

With the vehicle seat apparatus described above, the occupant condition detection unit detects whether the occupant seated in one of the pair of vehicle seats is using a cellular phone. When the control unit determines that the occupant seated in one of the pair of vehicle seats is using the cellular phone based on the detection result obtained by the occupant condition detection unit, the control unit controls the swiveling drive unit so that the vehicle seat occupied by the occupant who is using the cellular phone is automatically swiveled toward the outward-oriented position. Thus, it is possible to provide the occupant who is seated in one of the pair of vehicle seats and using the cellular phone with a personal space. As a result, this occupant can use the cellular phone without worrying about the other occupants.

The vehicle seat apparatus described above may further include a vehicle outside condition detection unit that detects the condition outside the vehicle. The swiveling drive unit may be able to swivel at least one of the pair of vehicle seats toward the inward-oriented position. When the control unit determines based on the detection result obtained by the vehicle outside condition detection unit that the condition outside the vehicle is unsuitable for keeping an occupant seated in one of the pair of vehicle seats, which is in the frontward-oriented position or the outward-oriented position, the control unit may control the swiveling drive unit so that the vehicle seat which is occupied by the occupant for whom the condition outside the vehicle is unsuitable is swiveled from the frontward-oriented position or the outward-oriented position toward the inward-oriented position.

With the vehicle seat apparatus described above, the vehicle outside condition detection unit detects the condition outside the vehicle. When the control unit determines based on the detection result obtained by the vehicle outside condition detection unit that the condition outside the vehicle is unsuitable for keeping the occupant seated in one of the pair of vehicle seats, which is in the frontward-oriented position or the outward-oriented position, the control unit controls the swiveling drive unit so that the vehicle seat which is occupied by the occupant for whom the condition outside the vehicle is unsuitable is automatically swiveled from the frontward-oriented position or the outward-oriented position toward the inward-oriented position. Thus, the occupants seated in the pair of vehicle seats can communicate with each other more easily.

In the vehicle seat apparatus described above, the vehicle outside condition detection unit may detect whether it is noisy outside the vehicle. When the control unit determines that it is noisy outside the vehicle based on the detection result obtained by the vehicle outside condition detection unit, the control unit may control the swiveling drive unit so that at least one of the pair of vehicle seats is automatically swiveled from the frontward-oriented position or the outward-oriented position toward the inward-oriented position.

With the vehicle seat apparatus described above, when the control unit determines that it is noisy outside the vehicle, the control unit controls the swiveling drive unit so that at least one of the pair of vehicle seats is automatically swiveled from the frontward-oriented position or the outward-oriented position toward the inward-oriented position. Thus, even when it is noisy outside the vehicle, the occupants seated in the pair of vehicle seats can communicate with each other more easily.

In the vehicle seat apparatus described above, the vehicle outside condition detection unit may detect whether the vehicle is traveling in a daytime or at night. When the control unit determines that the vehicle is traveling at night based on the detection result obtained by the vehicle outside condition detection unit, the control unit may control the swiveling drive unit so that at least one of the pair of vehicle seats is swiveled from the frontward-oriented position or the outward-oriented position toward the inward-oriented position.

With the vehicle seat apparatus described above, when the control unit determines that the vehicle is traveling at night, the control unit controls the swiveling drive unit so that at least one of the pair of vehicle seats is automatically swiveled from the frontward-oriented position or the outward-oriented position toward the inward-oriented position. Thus, when night falls, communication between the occupants seated in the pair of vehicle seats is promoted.

In the vehicle seat apparatus described above, the vehicle outside condition detection unit may detect brightness outside the vehicle. When the control unit determines that the brightness outside the vehicle is equal to or lower than a predetermined reference value based on the detection result obtained by the vehicle outside condition detection unit, the control unit may control the swiveling drive unit so that at least one of the pair of vehicle seats is swiveled from the frontward-oriented position or the outward-oriented position toward the inward-oriented position.

With the vehicle seat apparatus described above, when the control unit determines that the brightness outside the vehicle is equal to or lower than the predetermined reference value, the control unit controls the swiveling drive unit so that at least one of the pair of vehicle seats is automatically swiveled from the frontward-oriented position or the outward-oriented position toward the inward-oriented position. Thus, when it gets dark outside the vehicle, communication between the occupants seated in the pair of vehicle seats is promoted.

In the vehicle seat apparatus described above, the swiveling drive unit may be able to swivel at least one of the pair of vehicle seats toward the inward-oriented position, the occupant condition detection unit may detect whether the occupant seated in one of the pair of vehicle seats has a meal alone. When the control unit determines that the occupant seated in one of the pair of vehicle seats has a meal with another occupant in the vehicle based on the detection result obtained by the occupant condition detection unit, the control unit may control the swiveling drive unit so that the vehicle seat occupied by the occupant who has a meal with the other occupant in the vehicle seat is swiveled toward the inward-oriented position.

With the vehicle seat apparatus described above, the occupant condition detection unit detects whether the occupant seated in one of the pair of vehicle seats has a meal alone. When the control unit determines that the occupant seated in one of the pair of vehicle seats has a meal with the other occupant in the vehicle based on the detection result obtained by the occupant condition detection unit, the control unit controls the swiveling drive unit so that the vehicle seat occupied by the occupant who has a meal with the other occupant is automatically swiveled toward the inward-oriented position. Thus, the occupant who is seated in one of the pair of vehicle seats can have a meal with the other occupant more easily.

In the vehicle seat apparatus described above, the swiveling drive unit may be able to swivel at least one of the pair of vehicle seats toward the inward-oriented position, and the occupant condition detection unit may detect the condition of an occupant seated in a child seat that is attached to one of the pair of vehicle seats or a seat other than the pair of vehicle seats. When the control unit determines that one of the pair of vehicle seats needs to be swiveled toward the inward-oriented position based on the detection result obtained by the occupant condition detection unit, the control unit controls the swiveling drive unit so that the vehicle seat that needs to be swiveled toward the inward-oriented position is swiveled toward the inward-oriented position.

With the vehicle seat apparatus described above, the occupant condition detection unit detects the condition of the occupant seated in the child seat that is attached to one of the pair of vehicle seats or the seat other than the pair of vehicle seats. When the control unit determines that one of the pair of vehicle seats needs to be swiveled toward the inward-oriented position based on the detection result obtained by the occupant condition detection unit, the control unit controls the swiveling drive unit so that the vehicle seat that needs to be swiveled toward the inward-oriented position is automatically swiveled toward the inward-oriented position.

As described so far in detail, according to the invention, it is possible to automatically swivel the vehicle seat to a position suitable for the condition of the occupant in the vehicle. Thus, the usability of the vehicle seat is enhanced. As a result, it is possible to further increase the comfort of the passenger compartment.

BRIEF DESCRIPTION OF THE DRAWINGS

The features, advantages and technical and industrial significance of this invention will be described in the following detailed description of an example embodiment of the invention with reference to the accompanying drawings, in which like numerals denote like elements, and wherein:

FIG. 11 is a view showing the automobile seat apparatus according to a modification of the embodiment oft the invention;

FIG. 12 is a view showing the automobile seat apparatus according to a modification of the embodiment of the invention; and FIG. 13 is a view showing the automobile seat apparatus according to a modification of the embodiment of the invention.

DETAILED DESCRIPTION OF THE EMBODIMENT

An example embodiment of the invention will be described in greater detail below with reference to the accompanying drawings. In the embodiment described below, a vehicle seat apparatus according to the invention is used as an automobile seat apparatus for, for example, a passenger automobile such as a minivan.

Figure 1:
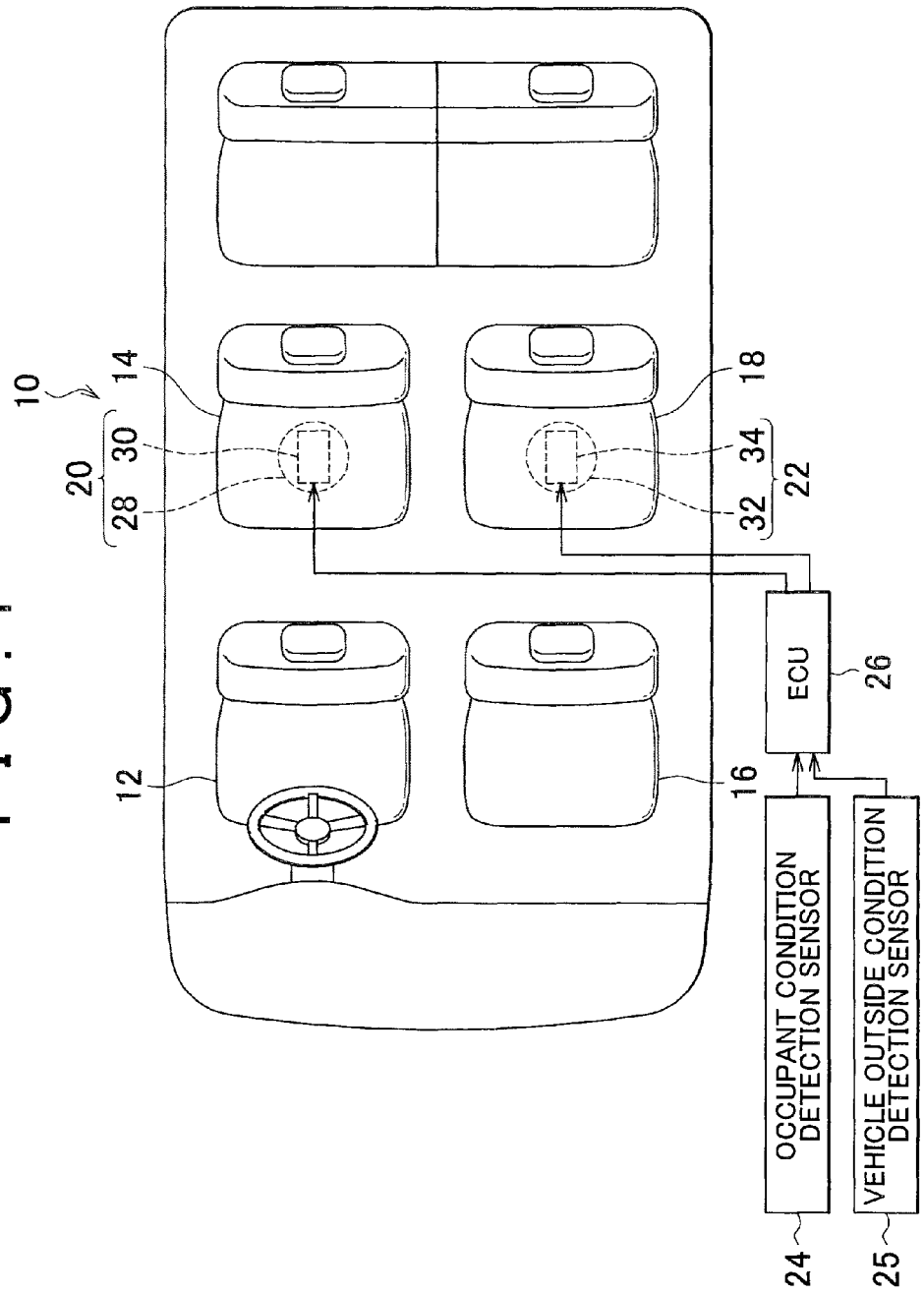
FIG. 1 is a plane view showing the inside of a passenger compartment of an automobile to which an automobile seat apparatus according to an embodiment of the invention is applied.

FIG. 1 is a plane view showing the inside of an automobile that includes an automobile seat apparatus 10 which is a vehicle seat apparatus according to the embodiment of the invention. FIGS. 2 to 5 show examples of the operation of the automobile seat apparatus 10.

As shown in FIGS. 1 to 5, the automobile seat apparatus 10 according to the embodiment of the invention includes a second-row driver-side seat 14 that is arranged behind a driver's seat 12, a second-row passenger-side seat 18 that is arranged behind a passenger's seat 16, swiveling drive mechanisms 20 and 22, an occupant condition detection sensor 24, a passenger compartment outside condition detection sensor 25, and an ECU (Electronic Control Unit) 26.

Figure 2:
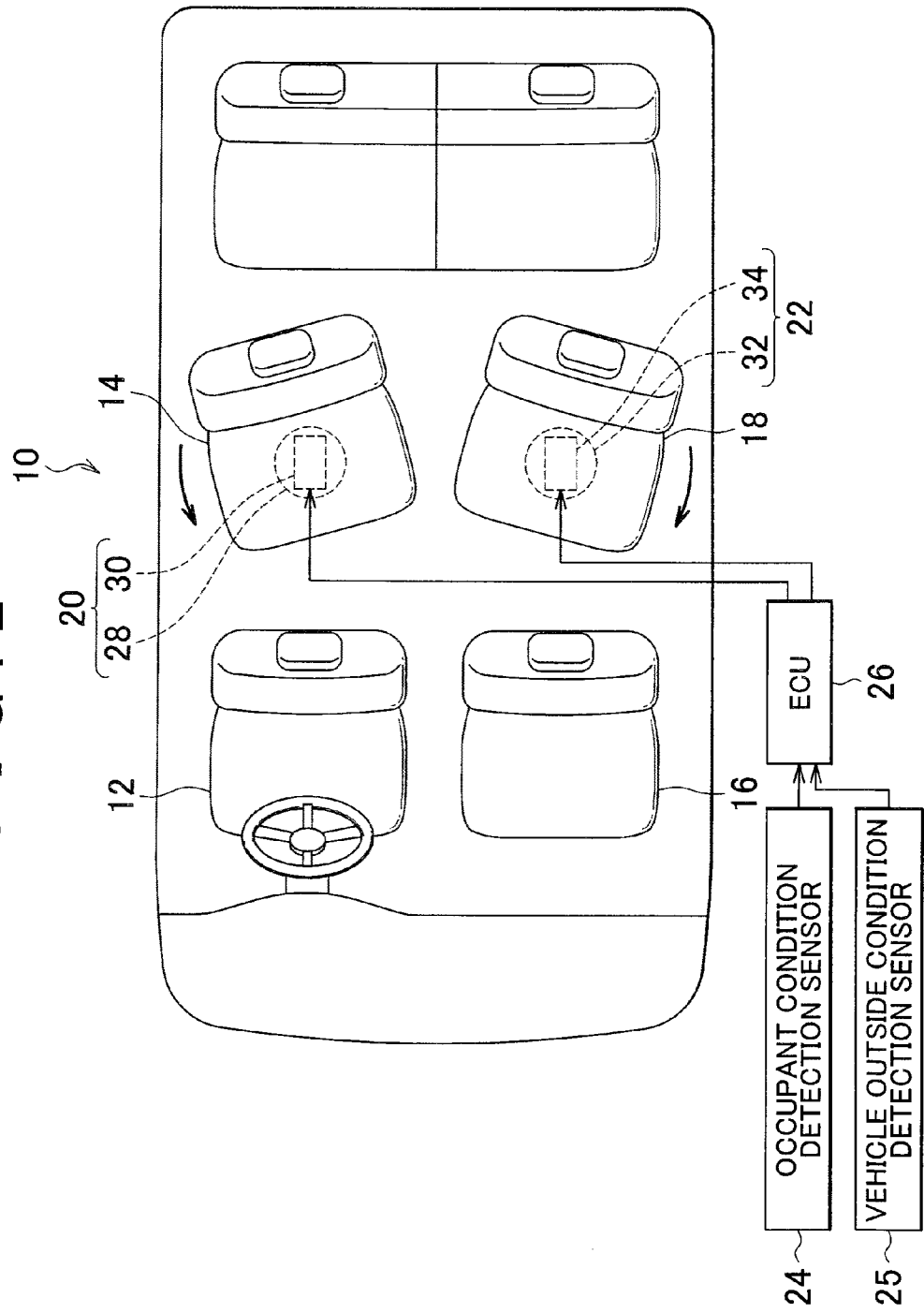
FIG. 2 is a view showing an example of the operation of the automobile seat apparatus shown in FIG. 1.
Figure 3:
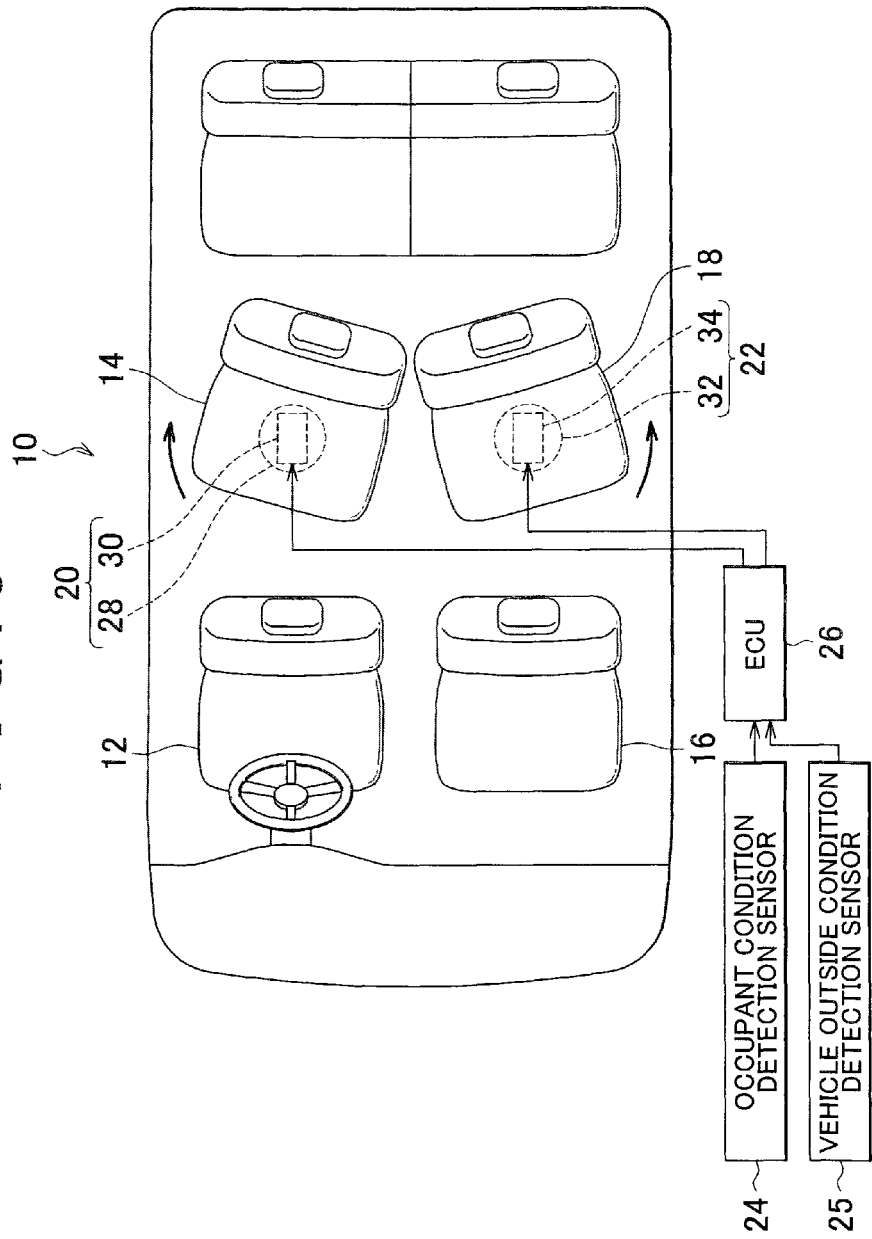
FIG. 3 is a view showing an example of the operation of the automobile seat apparatus shown in FIG. 1.

The swiveling drive mechanism 20 includes a swiveling support unit 28 and a motor drive unit 30. The swiveling support unit 28 supports the second-row driver-side seat 14 in such a manner that the second-row driver-side seat 14 is allowed to swivel with respect to a passenger compartment floor. In this way, the second-row driver-side seat 14 is in one of a frontward-oriented position in which the second-row driver-side seat 14 is oriented toward the front of the automobile as shown in FIG. 1, an inward-oriented position in which the second-row driver-side seat 14 is oriented in the inward direction of the automobile as shown in FIG. 2, and an outward-oriented position in which the second-row driver-side seat 14 is oriented in the outward direction of the automobile as shown in FIG. 3. The motor drive unit 30 swivels the second-row driver-side seat 14 that is supported by the above-described swiveling support unit 28 so that the second-row driver-side seat 14 is in one of the frontward-oriented position, the inward-oriented position and the outward-oriented position, which is selected based on a control signal from the ECU 26.

Similarly, the swiveling drive mechanism 22 includes a swiveling support unit 32 and a motor drive unit 34. The swiveling support unit 32 supports the second-row passenger-side seat 18 in such a manner that the second-row passenger-side seat 18 is allowed to swivel with respect to the passenger compartment floor. In this way, the second-row passenger-side seat 18 is in one of a frontward-oriented position in which the second-row passenger-side seat 18 is oriented toward the front of the automobile as shown in FIG. 1, an inward-oriented position in which the second-row passenger-side seat 18 is oriented in the inward direction of the automobile as shown in FIG. 2, and an outward-oriented position in which the second-row passenger-side seat 18 is oriented in the outward direction of the automobile as shown in FIG. 3. The motor drive unit 34 swivels the second-row passenger-side seat 18 that is supported by the above-described swiveling support unit 32 so that the second-row passenger-side seat 18 is in one of the frontward-oriented position, the inward-oriented position and the outward-oriented position, which is selected based on a control signal from the ECU 26.

The occupant condition detection sensor 24 includes, for example, a microphone, a camera, an occupant-presence detection sensor, a window open/closed condition sensor, a smoke sensor, a radio wave sensor, and a speaking key operation detection sensor. When activated by the ECU 26, the occupant condition detection sensor 24 detects the conditions of the occupants seated in the second-row driver-side seat 14 and the second-row passenger-side seat 18, and transmits occupant condition detection signals that indicate the conditions of these occupants to the ECU 26.

The passenger compartment outside condition detection sensor 25 includes, for example, a microphone, a camera, and a photoelectronic sensor. When activated by the ECU 26, the passenger compartment outside condition detection sensor 25 detects the condition outside the passenger compartment, and transmits a passenger compartment outside condition detection signal that indicates the condition outside the passenger compartment to the ECU 26.

As described later in detail, the ECU 26 is configured to be placed in any one of the atmosphere detection mode, the sleepiness detection mode, the physical condition detection mode, the passenger compartment outside communication detection mode, the smoking detection mode, the quarreling detection mode, the eating condition detection mode, the cellular phone usage detection mode, the passenger compartment outside condition detection mode, and the child seat occupant condition detection mode.

Based on a command signal from a mode selection switch provided in the passenger compartment, a preset algorithm, etc., the mode of the ECU 26 is switched among the atmosphere detection mode, the sleepiness detection mode, the physical condition detection mode, the passenger compartment outside communication detection mode, the smoking detection mode, the quarreling detection mode, the eating condition detection mode, the cellular phone usage detection mode, the passenger compartment outside condition detection mode, and the child seat occupant condition detection mode.

When placed in one of the modes described above, the ECU 26 controls the motor drive units 30 and 34 based on an occupant condition detection signal from the above-described occupant condition detection sensor 24 and a passenger compartment outside condition detection signal from the passenger compartment outside condition detection sensor 25.

The second-row driver-side seat 14 and the second-row passenger-side seat 18 in the embodiment each correspond to a vehicle seat, and the swiveling drive mechanisms 20 and 22 each correspond to a swiveling drive unit. The occupant condition detection sensor 24 corresponds to an occupant condition detection unit, a passenger compartment outside condition detection sensor 25 corresponds to a vehicle outside condition detection unit, and the ECU 26 corresponds to a control unit.

Next, the effects of the automobile seat apparatus 10 according to the embodiment of the invention will be described along with the control executed by the ECU 26 in each mode.

Figure 6:
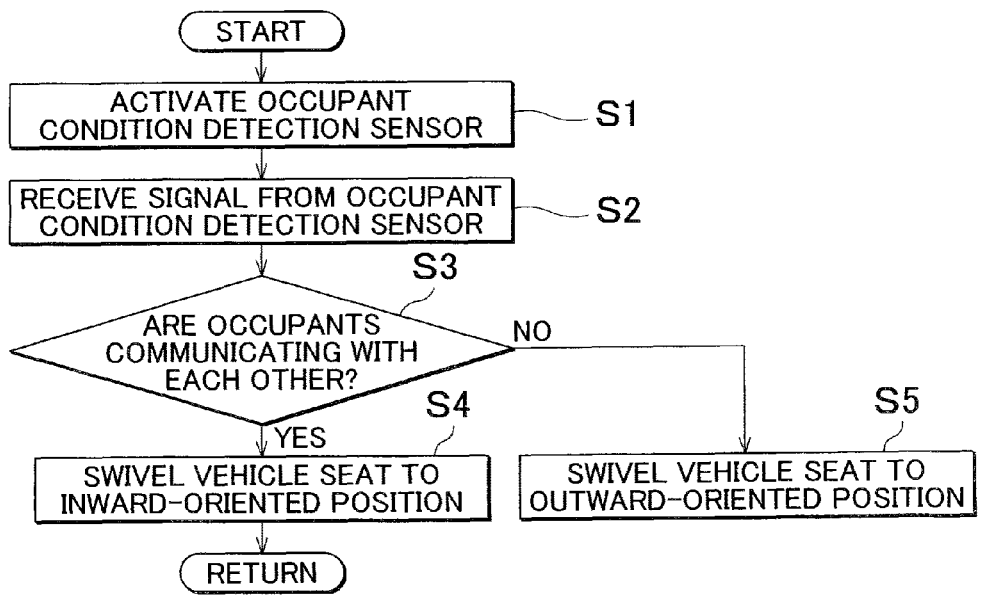
FIG. 6 is a flowchart showing the control executed by an ECU in the atmosphere detection mode.

First, the atmosphere detection mode will be described. FIG. 6 is a flowchart showing the control executed by the ECU 26 in the atmosphere detection mode. When placed in the atmosphere detection mode, the ECU 26 executes the program shown in the flowchart in FIG. 6. When starting this program, the ECU 26 first activates the occupant condition detection sensor 24 (step (hereinafter, referred to as "S") 1).

When activated by the ECU 26, the occupant condition detection sensor 24 transmits occupant condition detection signals indicating the conditions of the occupants seated in the second-row driver-side seat 14 and the second-row passenger-side seat 18 to the ECU 26.

After receiving the occupant condition detection signals from the occupant condition detection sensor 24 (S2), the ECU 26 analyzes the occupant condition detection signals and determines whether the occupant seated in the second-row driver-side seat 14 and the occupant seated in the second-row passenger-side seat 18 are communicating with each other (S3).

Whether these occupants are communicating with each other is determined by the following method.

For example, the voices of the occupants seated in second-row driver-side seat 14 and the second-row passenger-side seat 18 are detected by the microphone of the occupant condition detection sensor 24. If it is determined, based on the result of analysis on the detected voices, which is performed by the ECU 26, that the voices from two directions, that is, the voices from the second-row driver-side seat 14 and the second-row passenger-side seat 18, are continuously detected for a predetermined duration or longer, it is determined that these occupants are communicating with each other.

Alternatively, the images of the face of the occupant seated in the second-row driver-side seat 14 and the face of the occupant seated in the second-row passenger-side seat 18 are captured. Then, if it is determined, based on the result of analysis on the captured images of the faces of these occupant, which is performed by the ECU 26, that the state in which the faces of these occupants face each other continues for a predetermined duration or longer, it is determined that these occupants are communicating with each other.

If it is determined that the occupants seated in the second-row driver-side seat 14 and the second-row passenger-side seat 18 are communicating with each other, the ECU 26 transmits a control signal indicating a command to swivel the second-row driver-side seat 14 from the frontward-oriented position to the inward-oriented position to the motor drive unit 30, and transmits a control signal indicating a command to swivel the second-row passenger-side seat 18 from the frontward-oriented position to the inward-oriented position to the motor drive unit 34 (S4).

Thus, the second-row driver-side seat 14 and the second-row passenger-side seat 18 are automatically swiveled from the frontward-oriented positions shown in FIG. 1 to the inward-oriented positions (i.e. the positions in which the occupants seated in these seats 14 and 18 face each other) shown in FIG. 2. In this way, these occupants are communicating with each other more easily.

As described above, with the automobile seat apparatus 10 according to the embodiment of the invention, when the occupants seated in the second-row driver-side seat 14 and the second-row passenger-side seat 18 are communicating with each other, the second-row driver-side seat 14 and the second-row passenger-side seat 18 are automatically swiveled so that these seats 14 and 18 are in the inward-oriented positions. As a result, these occupants are communicating with each other more easily.

On the other hand, if it is determined that the occupants seated in the second-row driver-side seat 14 and the second-row passenger-side seat 18 are not communicating with each other, the ECU 26 transmits a control signal indicating a command to swivel the second-row driver-side seat 14 from the frontward-oriented position to the outward-oriented position to the motor drive unit 30, and transmits a control signal indicating a command to swivel the second-row passenger-side seat 18 from the frontward-oriented position to the outward-oriented position to the motor drive unit 34 (S5).

Thus, the second-row driver-side seat 14 and the second-row passenger-side seat 18 automatically are swiveled from the frontward-oriented positions shown in FIG. 1 to the outward-oriented positions (i.e. positions in which the occupants seated in these seats 14 and 18 sit back to back) shown in FIG. 3. Thus, a personal space (for example, a space useful for the occupant to relax or to enjoy scenery seen from a window) is created for each of the occupants seated in the second-row driver-side seat 14 and the second-row passenger-side seat 18.

As described above, with the automobile seat apparatus 10 according to the embodiment of the invention, when the occupants seated in the second-row driver-side seat 14 and the second-row passenger-side seat 18 are not communicating with each other, the second-row driver-side seat 14 and second-row passenger-side seat 18 are automatically swiveled to the outward-oriented positions so that a personal space (for example, a space useful for the occupant to relax or to enjoy scenery seen from the window) is created for each of the occupants seated in the second-row driver-side seat 14 and the second-row passenger-side seat 18.

The ECU 26 periodically executes S1 to S5 until a power supply is turned off or until the ECU 27 is placed in a mode other than the atmosphere detection mode.

When the power supply is turned off or when the ECU 26 is placed in a mode other than the atmosphere detection mode, the motor drive units 30 and 34 are controlled by the ECU 26 so that the second-row driver-side seat 14 and the second-row passenger-side seat 18 are automatically swiveled from the inward-oriented positions or the outward-oriented positions to the frontward-oriented positions.

For example, even if the ECU 26 determines that the occupants seated in the second-row driver-side seat 14 and the second-row passenger-side seat 18 are not communicating with each other and therefore the second-row driver-side seat 14 and the second-row passenger-side seat 18 are swiveled to the outward-oriented positions, if it is determined later that the occupants are communicating with each other, the motor drive units 30 and 34 are controlled by the ECU 26 so that the second-row driver-side seat 14 and the second-row passenger-side seat 18 are automatically swiveled from the outward-oriented positions to the inward-oriented positions. In this way, the occupants are communicating with each other more easily.

Similarly, if the ECU 26 determines that the occupants seated in the second-row driver-side seat 14 and the second-row passenger-side seat 18 are communicating with each other and therefore the second-row driver-side seat 14 and the second-row passenger-side seat 18 are swiveled to the inward-oriented positions, if it is determined later that the occupants are not communicating with each other, the motor drive units 30 and 34 are controlled by the ECU 26 so that the second-row driver-side seat 14 and the second-row passenger-side seat 18 are automatically swiveled from the inward-oriented positions to the outward-oriented positions. In this way, a personal space (for example a personal space used to relax or used to enjoy scenery seen from the window) is created for each of the occupants seated in the second-row driver-side seat 14 and the second-row passenger-side seat 18.

As described above, with the automobile seat apparatus 10 according to the embodiment of the invention, it is possible to automatically swivel the second-row driver-side seat 14 and the second-row passenger-side seat 18 to the positions that are suitable for the condition of communication between the occupants seated in the second-row driver-side seat 14 and the second-row passenger-side seat 18.

Also, with the automobile seat apparatus 10 according to the embodiment of the invention, if it is determined that these occupants are not communicating with each other, the second-row driver-side seat 14 and the second-row passenger-side seat 18 are automatically swiveled to the outward-oriented positions. Therefore, it is not necessary to manually swivel the second-row driver-side seat 14 and the second-row passenger-side seat 18 to the outward-oriented positions. Thus, it is possible to swivel the second-row driver-side seat 14 and the second-row passenger-side seat 18 to the outward-oriented positions to create personal spaces without spoiling the mood in the automobile (without hurting the feeling of the fellow occupant).

Figure 7:
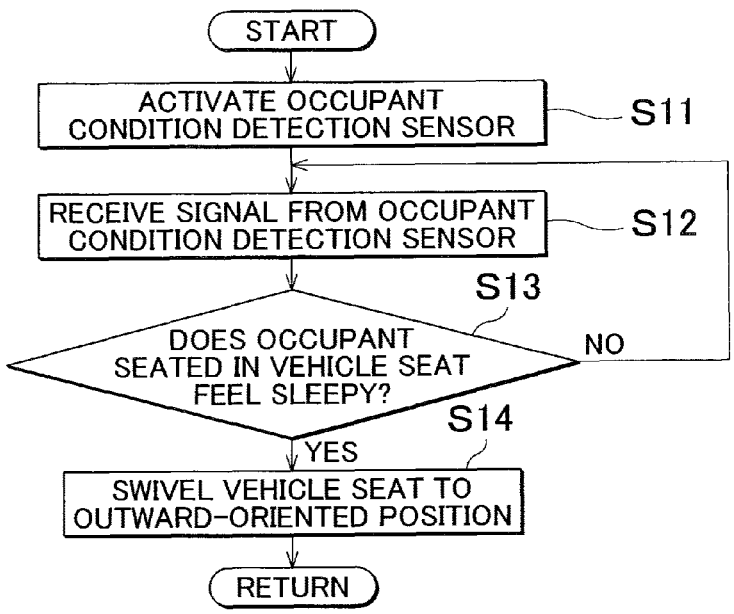
FIG. 7 is a flowchart showing the control executed by the ECU in the sleepiness detection mode.

Next, the sleepiness detection mode will be described. FIG. 7 is a flowchart showing the control executed by the ECU 26 in the sleepiness detection mode. When placed in the sleepiness detection mode, the ECU 26 executes the program shown in the flowchart in FIG. 7. When starting this program, the ECU 26 first activates the occupant condition detection sensor 24 (S11).

When activated by the ECU 26, the occupant condition detection sensor 24 transmits occupant condition detection signals indicating the conditions of the occupants seated in the second-row driver-side seat 14 and the second-row passenger-side seat 18 to the ECU 26.

After receiving the occupant condition detection signals from the occupant condition detection sensor 24 (S12), the ECU 26 analyzes the occupant condition detection signals and determines whether the arousal level of each of the occupants seated in the second-row driver-side seat 14 and the second-row passenger-side seat 18 has been decreased, that is, whether each of the occupants feels sleepy (S13).

Whether each of the occupants feels sleepy is determined by the following method.

For example, the images of the face of the occupant seated in the second-row driver-side seat 14 and the face of the occupant seated in the second-row passenger-side seat 18 are captured by the camera of the occupant condition detection camera 24. Then, the ECU 26 calculates the number of times each occupant blinks within a predetermined duration based on the result of analysis on the captured image. If the number of times the occupant blinks is smaller than a predetermined reference value, it is determined that this occupant feels sleepy.

If it is determined that no occupant is seated in at least one of the second-row driver-side seat 14 and the second-row passenger-side seat 18 based on signals from the occupant-presence detection sensor of the occupant condition detection sensor 24, the ECU 26 does not make the above-described determination concerning the seat in which no occupant is seated.

Then, if it is determined that the occupants in the second-row driver-side seat 14 and the second-row passenger-side seat 18 do not feel sleepy, the ECU 26 executes S12.

On the other hand, if it is determined that at least one of the occupants seated in the second-row driver-side seat 14 and the second-row passenger-side seat 18 feels sleepy, the ECU 26 transmits a control signal indicating a command to swivel the seat from the frontward-oriented position to the outward-oriented position to at least one of the motor drive units 30 and 34 as appropriate (S14).

Thus, at least one of the second-row driver-side seat 14 and the second-row passenger-side seat 18, which is occupied by the occupant who feels sleepy, is automatically swiveled from the frontward-oriented position to the outward-oriented position. As a result, the occupant who feels sleepy is provided with a personal space, that is, an environment in which this occupant can take a nice sleep.

Figure 4:
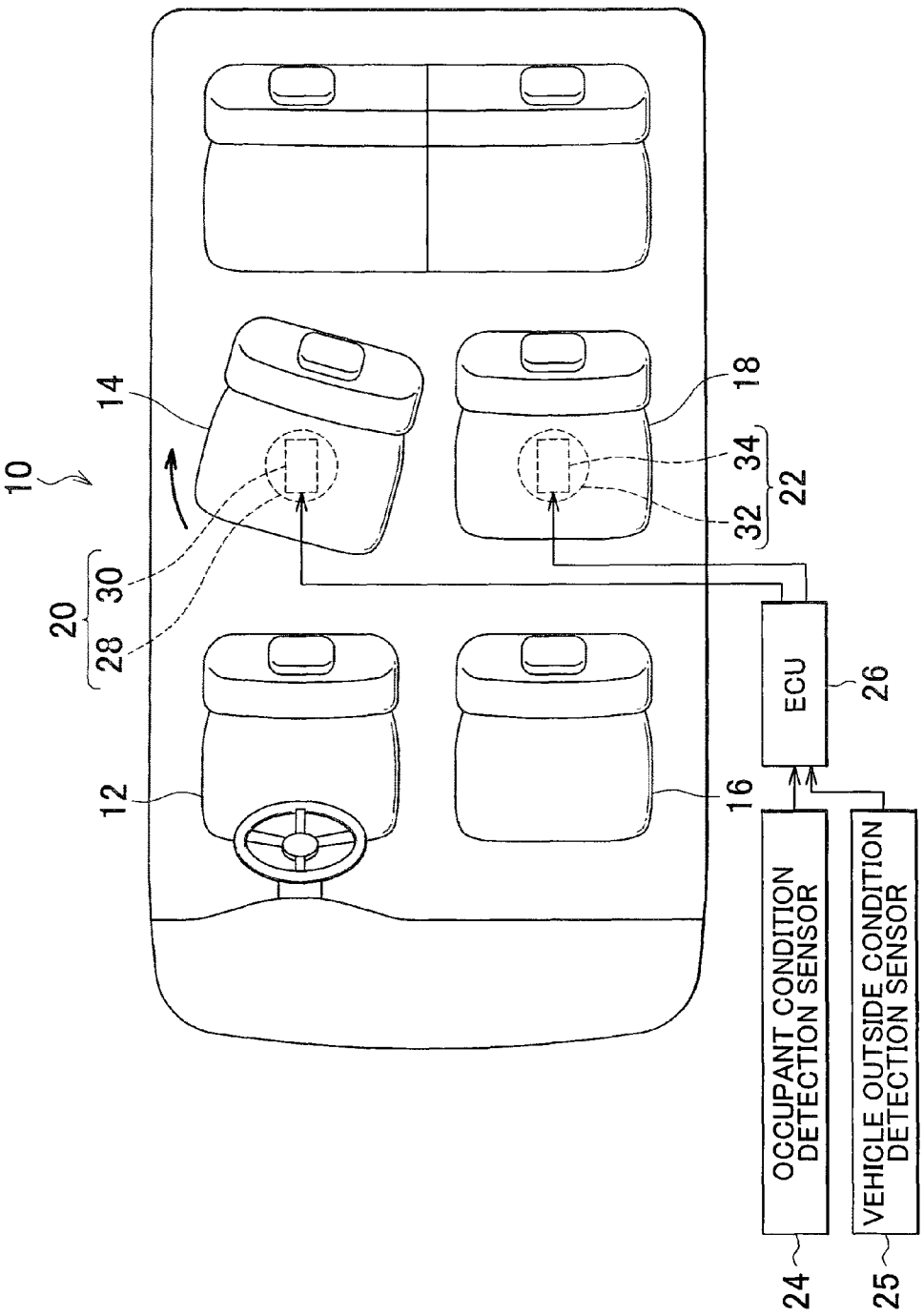
FIG. 4 is a view showing an example of the operation of the automobile seat apparatus shown in FIG. 1.

For example, if the ECU 26 determines that the occupant seated in the second-row driver-side seat 14 feels sleepy, the second-row driver-side seat 14 is automatically swiveled from the frontward-oriented position to the outward-oriented position as shown in FIG. 4. Thus, the environment in which the occupant seated in the second-row driver-side seat 14 takes a nice sleep is created.

Figure 5:
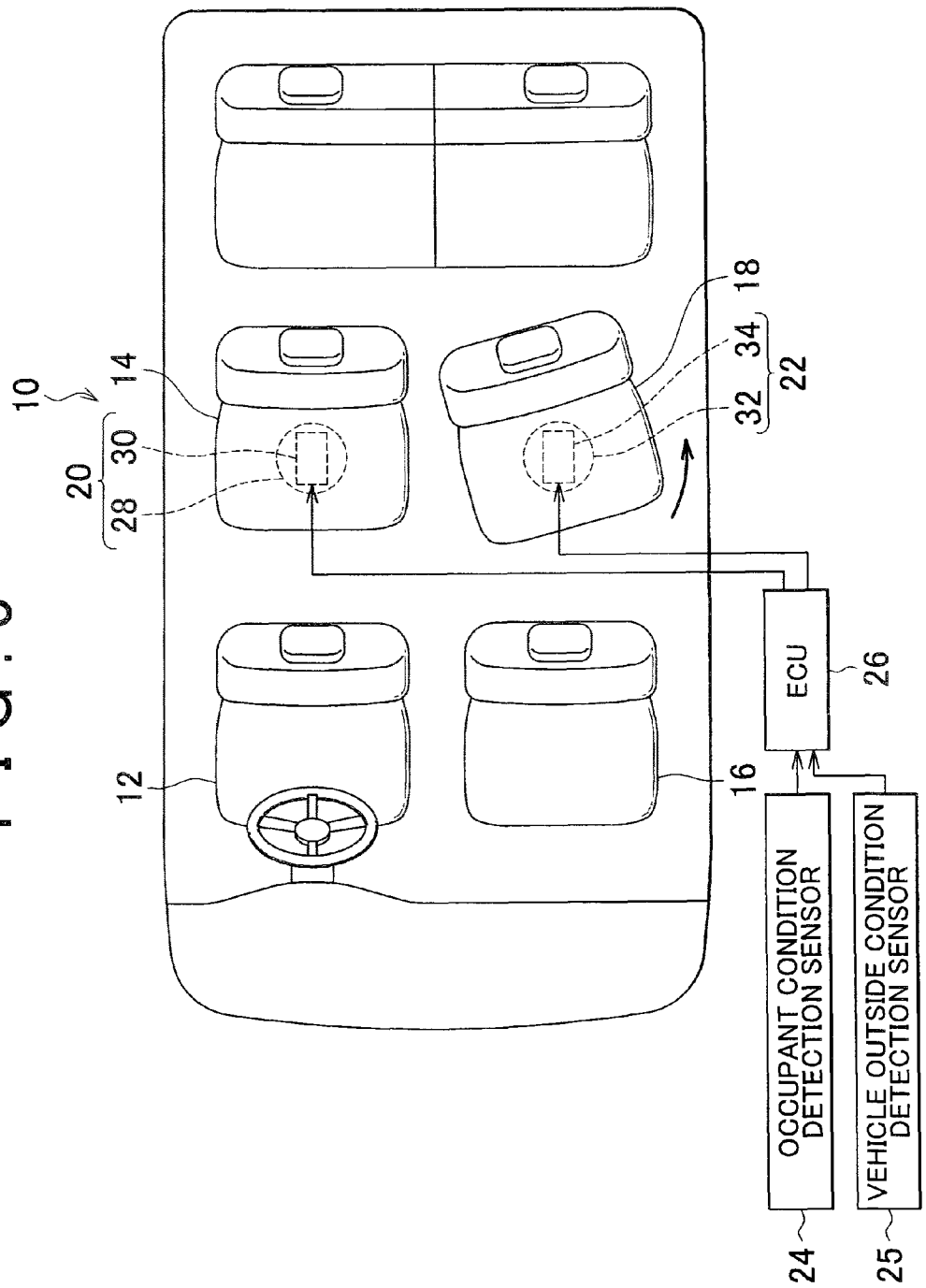
FIG. 5 is a view showing an example of the operation of the automobile seat apparatus shown in FIG. 1.

Similarly, if the ECU 26 determines that the occupant seated in the second-row passenger-side seat 18 feels sleepy, the second-row passenger-side seat 18 is automatically swiveled from the frontward-oriented position to the outward-oriented position as shown in FIG. 5. Thus, the environment in which the occupant seated in the second-row passenger-side seat 18 takes a nice speed is created.

As described above, with the automobile seat apparatus 10 according to the embodiment of the invention, when at least one of the occupants seated in the second-row driver-side seat 14 and the second-row passenger-side seat 18 feels sleepy (that is, the arousal level of at least one of the occupants seated in the second-row driver-side seat 14 and the second-row passenger-side seat 18 has been decreased), at least one of the second-row driver-side seat 14 and the second-row passenger-side seat 18, which is occupied by the occupant who feels sleepy, is automatically swiveled to the outward-oriented position so that the environment in which this occupant can take a nice sleep is created.

The ECU 26 periodically executes S11 to S14 until the power supply is turned off or until the ECU 26 is placed in a mode other than the sleepiness detection mode.

Figure 8:
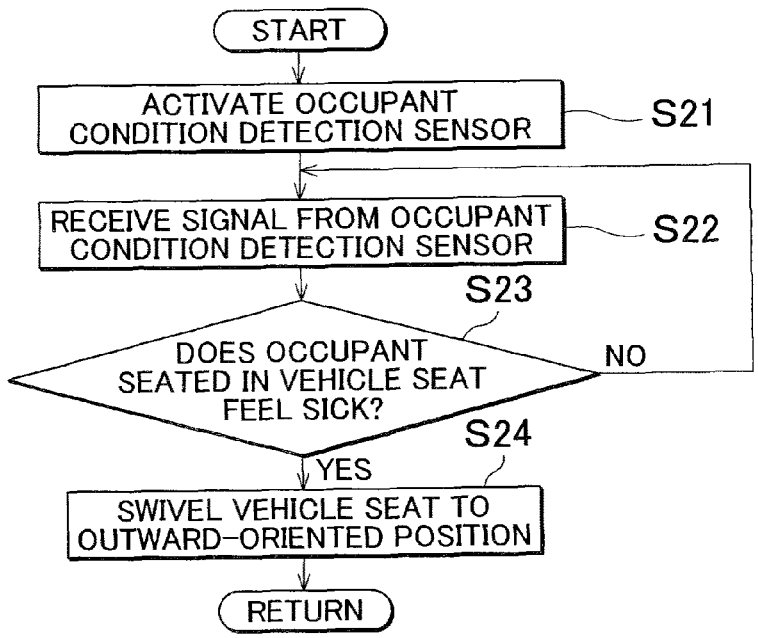
FIG. 8 is a flowchart showing the control executed by the ECU in the physical condition detection mode.

Next, the physical condition detection mode will be described. FIG. 8 is a flowchart showing the control executed by the ECU 26 in the physical condition detection mode. When placed in the physical condition detection mode, the ECU 26 executes the program shown in the flowchart in FIG. 8. When starting this program, the ECU 26 first activates the occupant condition detection sensor 24 (S21).

When activated by the ECU 26, the occupant condition detection sensor 24 transmits occupant condition detection signals indicating the conditions of the occupants seated in the second-row driver-side seat 14 and the second-row passenger-side seat 18 to the ECU 26.

After receiving the occupant condition detection signals from the occupant condition detection sensor 24 (S22), the ECU 26 analyzes the occupant condition detection signals and determines whether each of the occupants seated in the second-row driver-side seat 14 and the second-row passenger-side seat 18 feels sick (for example, whether each occupant gets motion sickness) (S23).

Whether each of these occupants feels sick is determined by the following method.

For example, the images of the face of the occupant seated in the second-row driver-side seat 14 and the face of the occupant seated in the second-row passenger-side seat 18 are captured by the camera of the occupant condition detection sensor 24. If the ECU 26 determines that the occupant looks pale based on the captured image of his/her face, or the facial expression of the occupant in the captured image matches a facial expression pattern peculiar to poor physical condition, it is determined that the occupant feels sick.

If it is determined that no occupant is seated in at least one of the second-row driver-side seat 14 and the second-row passenger-side seat 18 based on signals from the occupant-presence detection sensor of the occupant condition detection sensor 24, the ECU 26 does not make the above-described determination concerning the seat in which no occupant is seated.

If it is determined that the occupants seated in the second-row driver-side seat 14 and the second-row passenger-side seat 18 do not feel sick, the ECU 26 executes S22.

On the other hand, if it is determined that at least one of the occupants seated in the second-row driver-side seat 14 and the second-row passenger-side seat 18 feels sick, the ECU 26 transmits a control signal indicating a command to swivel the seat from the frontward-oriented position to the outward-oriented position to at least one of the motor drive units 30 and 34 as appropriate (S24).

Thus, at least one of the second-row driver-side seat 14 and the second-row passenger-side seat 18, which is occupied by the occupant who feels sick, is automatically swiveled from the frontward-oriented position to the outward-oriented position. As a result, the occupant who feels sick is provided with a personal space, that is, an environment in which this occupant can easily look out of the window to feel better.

For example, if the ECU 26 determines that the occupant seated in the second-row driver-side seat 14 feels sick, the second-row driver-side seat 14 is automatically swiveled from the frontward-oriented position to the outward-oriented position as shown in FIG. 4. Thus, the occupant seated in the second-row driver-side seat 14 is provided with an environment in which this occupant can easily look out of the window to feel better.

Similarly, if it is determined that the occupant seated in the second-row passenger-side seat 18 feels sick, the second-row passenger-side seat 18 is automatically swiveled from the frontward-oriented position to the outward-oriented position as shown in FIG. 5. Thus, the occupant seated in the second-row passenger-side seat 18 is provided with an environment in which this occupant can easily look out of window to feel better.

As described above, with the automobile seat apparatus 10 according to the embodiment of the invention, when at least one of the occupants seated in the second-row driver-side seat 14 and the second-row passenger-side seat 18 feels sick, at least one of the second-row driver-side seat 14 and the second-row passenger-side seat 18, which is occupied by the occupant who feels sick, is automatically swiveled to the outward-oriented position so that the occupant who feels sick is provided with the environment in which this occupant can easily look out of window to feel better.

Then, the ECU 26 periodically executes S21 to S24 until the power supply is turned off or until the ECU 26 is placed in a mode other than the physical condition detection mode.

Figure 9:
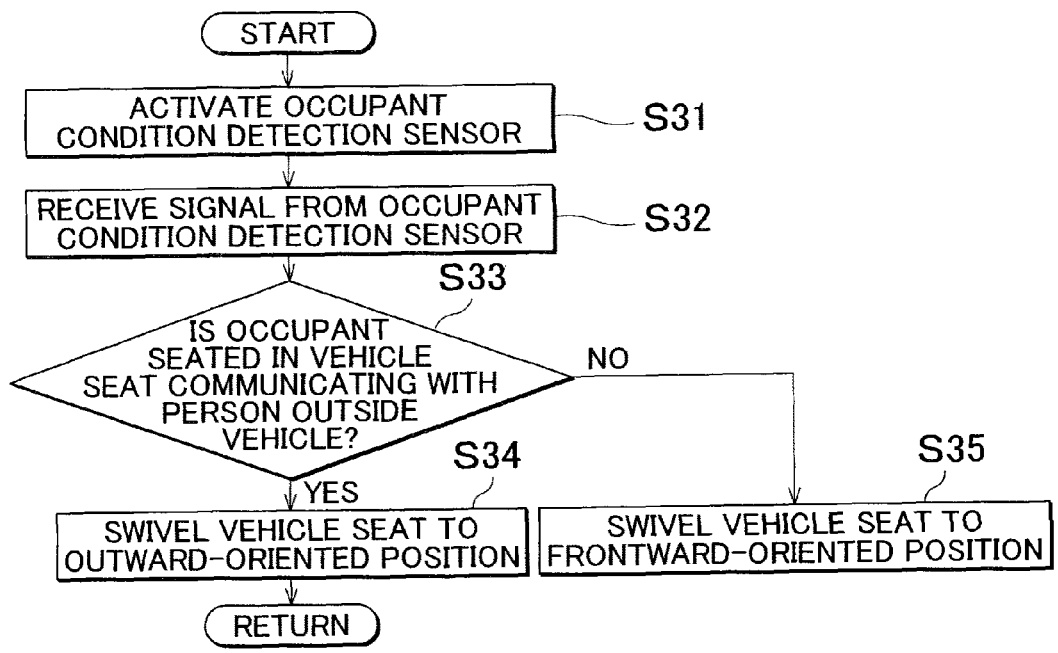
FIG. 9 is a flowchart showing the control executed by the ECU in the passenger compartment outside communication detection mode.

Next, the passenger compartment outside communication mode will be described. FIG. 9 is a flowchart showing the control executed by the ECU 26 in the passenger compartment outside communication detection mode. When placed in the passenger compartment outside communication detection mode, the ECU 26 executes the program shown in the flowchart in FIG. 9. When starting this program, the ECU 26 first activates the occupant condition detection sensor 24 (S31).

When activated by the ECU 26, the occupant condition detection sensor 24 transmits occupant condition detection signals indicating the conditions of the occupants seated in the second-row driver-side seat 14 and the second-row passenger-side seat 18 to the ECU 26.

After receiving the occupant condition detection signals from the occupant condition detection sensor 24 (S32), the ECU 26 analyzes the occupant condition detection signals and determines whether each of the occupants seated in the second-row driver-side seat 14 and the second-row passenger-side seat 18 is communicating with a person outside the passenger compartment (S33).

Whether each of these occupants is communicating with a person outside the passenger compartment is determined by the following method.

For example, the window open/closed condition sensor of the occupant condition detection sensor 24 detects the open/closed condition of a side window near the second-row driver-side seat 14 and the open/closed condition of a side window near the second-row passenger-side seat 18. Then, when a window opening detection signal indicating the fact that the side window near the second-row driver-side seat 14 is opened is transmitted from the window open/closed condition sensor to the ECU 26, the ECU 26 determines that the occupant seated in the second-row driver-side seat 14 is communicating with a person outside the passenger compartment. When a window opening detection signal indicating the fact that the side window near the second-row passenger-side seat 18 is opened is transmitted from the window open/closed condition sensor to the ECU 26, the ECU 26 determines that the occupant seated in the second-row passenger-side seat 18 is communicating with a person outside the passenger compartment.

For example, the direction in which the voice of the occupant seated in the second-row driver-side seat 14 proceeds and the direction in which the voice of the occupant seated in the second-row passenger-side seat 18 proceeds are detected by the microphone or the camera of the occupant condition detection sensor 24. If the ECU 26 determines that the voice of the occupant seated in the second-row driver-side seat 14 proceeds toward the outside of the passenger compartment based on the result of analysis on the information output from the microphone or the camera, it is determined that the occupant seated in the second-row driver-side seat 14 is communicating with a person outside the passenger compartment. If the ECU 26 determines that the voice of the occupant seated in the second-row passenger-side seat 18 proceeds toward the outside of the passenger compartment, it is determined that the passenger seated in the second-row passenger-side seat 18 is communicating with a person outside the passenger compartment.

Alternatively, whether radio waves are generated from the second-row driver-side seat 14 and the second-row passenger-side seat 18 is determined by the radio wave sensor of the occupant condition detection sensor 24. When receiving a radio wave detection signal indicating the fact that a radio wave is generated from the second-row driver-side seat 14 from the radio wave sensor, the ECU 26 determines that the occupant seated in the second-row driver-side seat 14 is communicating with a person outside the passenger compartment. When receiving a radio wave signal indicating the fact that a radio wave is generated from the second-row passenger-side seat 18 from the radio wave sensor, the ECU 26 determines that the occupant seated in the second-row passenger-side seat 18 is communicating with a person outside the passenger compartment.

If the ECU 26 determines that at least one of the occupants seated in the second-row driver-side seat 14 and the second-row passenger-side seat 18 is communicating with a person outside the passenger seat, the ECU 26 transmits a control signal indicating a command to swivel the seat from the frontward-oriented position to the outward-oriented position to at least one of the motor drive units 30 and 34 as appropriate (S34).

Thus, at least one of the second-row driver-side seat 14 and the second-row passenger-side seat 18, which is occupied by the occupant who is communicating with the person outside the passenger compartment, is automatically swiveled from the frontward-oriented position to the outward-oriented position (that is, toward the side window). As a result, this occupant is communicating with the person outside the passenger compartment more easily.

As described above, with the automobile seat apparatus 10 according to the embodiment of the invention, when at least one of the occupants seated in the second-row driver-side seat 14 and the second-row passenger-side seat 18 is communicating with a person outside the passenger compartment, at least one of the second-row driver-side seat 14 and the second-row passenger-side seat 18, which is occupied by the occupant who is communicating with the person outside the passenger compartment, is automatically swiveled to the outward-oriented position so that this occupant is communicating with the person outside the passenger compartment more easily.

If the ECU 26 determines that neither the occupants seated in the second-row driver-side seat 14 nor the second-row passenger-side seat 18 is communicating with a person outside the passenger compartment, the ECU 26 transmits a control signal indicating a command to swivel the second-row driver-side seat 14 from the outward-oriented position to the frontward-oriented position to the motor drive unit 30, and a control signal indicating a command to swivel the second-row passenger-side seat 18 from the outward-oriented position to the frontward-oriented position to the motor drive unit 34 (S35).

Then, the ECU 26 periodically executes S31 to S35 until the power supply is turned off or until the ECU 26 is placed in a mode other than the passenger compartment outside communication mode.

Next, the smoking detection mode will be described. When placed in the smoking detection mode, the ECU 26 executes the program that is similar to the programs executed in the sleepiness detection mode and the physical condition detection mode described above. When starting this program, the ECU 26 first activates the smoke sensor of the occupant condition detection sensor 24 and determines whether each of the occupants seated in the second-row driver-side seat 14 and the second-row passenger-side seat 18 is smoking based on detection signals from the smoke sensor.

Alternatively, the images of an area around the face of the occupant seated in the second-row driver-side seat 14 and an area around the face of the occupant seated in the second-row passenger-side seat 18 may be captured by the camera of the occupant condition detection sensor 24. Then, the ECU 26 may determine whether each of the occupants seated in the second-row driver-side seat 14 and the second-row passenger-side seat 18 is smoking based on the result of analysis on the captured image of his/her face.

If the ECU 26 determines that at least one of the occupants seated in the second-row driver-side seat 14 and the second-row passenger-side seat 18 is smoking, the ECU 26 transmits a control signal indicating a command to swivel the seat from the frontward-oriented position to the outward-oriented position to at least one of the motor drive units 30 and 34 as appropriate.

Thus, at least one of the second-row driver-side seat 14 and the second-row passenger-side seat 18, which is occupied by the occupant who is smoking, is automatically swiveled to the outward-oriented position (that is, toward the side window). Thus, the occupant who is smoking is provided with a personal space when he/she is smoking. For example, when this occupant is smoking, smoke does not flow toward the other occupants and smoke is discharged to the outside of the passenger compartment through the side window.

Next, the quarreling detection mode will be described. When placed in the quarreling detection mode, the ECU 26 executes the program that is similar to the programs executed in the sleepiness detection mode and the physical condition detection mode described above. When starting this program, the ECU 26 first activates the microphone of the occupant condition detection sensor 24 and determines whether, for example, the sound volume is equal to or greater than a predetermined reference value based on a detection signal from the microphone. In this way, the ECU 26 determines whether each of the occupants seated in the second-row driver-side seat 14 and the second-row passenger-side seat 18 is quarreling.

If the ECU 26 determines that at least one of the occupants seated in the second-row driver-side seat 14 and the second-row passenger-side seat 18 is quarreling, the ECU 26 transmits a control signal indicating a command to swivel the seat from the frontward-oriented position to the outward-oriented position to at least one of the motor drive units 30 and 34 as appropriate.

Thus, at least one of the second-row driver-side seat 14 and the second-row passenger-side seat 18, which is occupied by the occupant who is quarreling, is automatically swiveled to the outward-oriented position (that is, the position at which this occupant shows his/her back to another occupant with whom this occupant is quarreling), and the occupant who is seated in this seat is provided with a personal space. As a result, it is possible to smooth over a quarrel between the occupant who is seated in this seat and the other occupant.

Next, the eating condition detection mode will be described. When placed in the eating condition detection mode, the ECU 26 executes the program that is similar to the programs executed in the sleepiness detection mode and the physical condition detection mode. When starting this program, the ECU 26 first activates the camera of the occupant condition detection sensor 24 and determines whether each of the occupants seated in the second-row driver-side seat 14 and the second-row passenger-side seat 18 has a meal alone or each of the occupants seated in the second-row driver-side seat 14 and the second-row passenger-side seat 18 has a meal with another occupant in the passenger compartment.

If the ECU 26 determines that at least one of the occupants seated in the second-row driver-side seat 14 and the second-row passenger-side seat 18 has a meal alone, the ECU 26 transmits a control signal indicating a command to swivel the seat from the frontward-oriented position to the outward-oriented position to at least one of the motor drive units 30 and 34 as appropriate.

Thus, at least one of the second-row driver-side seat 14 and the second-row passenger-side seat 18, which is occupied by the occupant who has a meal alone, is automatically swiveled to the outward-oriented position (that is, the position at which this occupant shows his/her back to the other occupants). As a result, this occupant is able to have a meal alone without worrying about the other occupants.

On the other hand, if the ECU 26 determines that at least one of the occupants seated in the second-row driver-side seat 14 and the second-row passenger-side seat 18 has a meal with another occupant in the passenger compartment, the ECU 26 transmits a control signal indicating a command to swivel the seat from the frontward-oriented position to the inward-oriented position to at least one of the motor drive units 30 and 34 as appropriate.

Thus, at least one of the second-row driver-side seat 14 and the second-row passenger-side seat 18, which is occupied by the occupant who has a meal with the other occupant, is automatically swiveled to the inward-oriented position (that is, the position at which this occupant faces the other occupant). As a result, this occupant is able to have a meal with the other occupant more easily.

Next, the cellular phone usage detection mode will be described. When placed in the cellular phone usage mode, the ECU 26 first activates the radio wave sensor and the speaking key operation detection sensor of the occupant condition detection sensor 24. Then, when at least one of the occupants seated in the second-row driver-side seat 14 and the second-row passenger-side seat 18 gets an external phone call on his/her cellular phone, the ECU 26 is placed in the stand-by mode upon reception of an external radio wave by the radio wave sensor.

If the ECU 26 determines that a speaking key (off hook) of the cellular phone of at least one of the occupants seated in the second-row driver-side seat 14 and the second-row passenger-side seat 18 is operated based on a signal output from the speaking key operation detection sensor, the ECU 26 transmits a control signal indicating a signal to swivel the seat from the frontward-oriented position to the outward-oriented position to at least one of the motor drive units 30 and 34 as appropriate.

On the other hand, when at least one of the occupants seated in the second-row driver-side seat 14 and the second-row passenger-side seat 18 makes an external phone call from his/her cellular phone, the ECU 26 is placed in the stand-by mode when it is determined that the speaking key (off hook) of the cellular phone is operated based on a signal output from the speaking key operation detection sensor.

Then, if the ECU 26 determines that a radio wave is externally transmitted from the cellular phone of at least one of the occupants seated in the second-row driver-side seat 14 and the second-row passenger-side seat 18 based on a signal output from the radio wave sensor, the ECU 26 transmits a control signal indicating a command to swivel the seat from the frontward-oriented position to the outward-oriented position to at least one of the motor drive units 30 and 34 as appropriate.

As described above, in the cellular phone usage detection mode, if it is determined that at least one of the occupants seated in the second-row driver-side seat 14 and the second-row passenger-side seat 18 is using his/her cellular phone, a control signal indicating a command to swivel the seat from the frontward-oriented position to the outward-oriented position is transmitted at least one of the motor drive units 30 and 34 as appropriate. Thus, at least one of the second-row driver-side seat 14 and the second-row passenger-side seat 18, which is occupied by the occupant who is using the cellular phone, is automatically swiveled to the outward-oriented position (that is, the position at which this occupant shows his/her back to the other occupants). As a result, this occupant can use the cellular phone without worrying about the other occupants.

Next, the passenger compartment outside condition detection mode will be described. When the ECU 26 is placed in the passenger compartment outside condition detection mode, the ECU 26 executes the program that is similar to the programs executed in the sleepiness detection mode and the physical condition detection mode described above. When starting this program, the ECU 26 first activates the microphone, the camera, and the photoelectronic sensor of the passenger compartment outside condition detection sensor 25 and determines whether the condition outside the passenger compartment is unsuitable for maintaining at least one of the second-row driver-side seat 14 and the second-row passenger-side seat 18 in the outward-oriented position based on detection signals from the microphone, the camera, and the photoelectronic sensor of the passenger compartment outside condition detection sensor 25.

For example, if it is determined that the level of noise outside the passenger compartment is equal to or higher than a predetermined reference value based on a noise detection signal from the microphone of the passenger compartment outside condition detection sensor 25, the ECU 26 determines that the condition outside the passenger compartment is unsuitable for maintaining at least one of the second-row driver-side seat 14 and the second-row passenger-side seat 18 in the outward-oriented position.

For example, if it is determined that the automobile is traveling at night based on day/night determination signals from the camera and the photoelectronic sensor, the ECU 26 determines that the condition outside the passenger compartment is unsuitable for maintaining at least one of the second-row driver-side seat 14 and the second-row passenger-side seat 18 in the outward-oriented position.

For example, if the ECU 26 determines that the brightness outside the passenger compartment is equal to or lower than a predetermined reference value based on brightness detection signals from the camera and the photoelectronic sensor, the ECU 26 determines that the condition outside the passenger compartment is unsuitable for maintaining at least one of the second-row driver-side seat 14 and the second-row passenger-side seat 18 in the outward-oriented position.

If the ECU 26 determines that the condition outside the passenger compartment is unsuitable for maintaining at least one of the second-row driver-side seat 14 and the second-row passenger-side seat 18 in the outward-oriented position, the ECU 26 transmits a control signal indicating a command to swivel the seat from the outward-oriented position to the inward-oriented position to at least one of the motor drive units 30 and 34 as appropriate.

Thus, at least one of the second-row driver-side seat 14 and the second-row passenger-side seat 18 is automatically swiveled to the inward-oriented position based on the condition outside the passenger compartment. Thus, even when it is noisy outside the vehicle, the occupants can communicate with each other more easily. Also, when night falls or when it gets dark outside the passenger compartment, communication between the occupants is promoted.

Next, the child seat occupant condition detection mode will be described. When the ECU 26 is placed in the child seat occupant condition detection mode, the ECU 26 executes a program similar to the programs executed in the sleepiness detection mode and the physical condition detection mode. When starting this program, the ECU 26 first activates the microphone and the camera of the occupant condition detection sensor 24.

When activated by the ECU 26, the microphone and the camera of the occupant condition detection sensor 24 detect the condition of the occupant in the child seat that is attached to one of the second-row driver-side seat 14 and the second-row passenger-side seat 18 or a seat other than the second-row driver-side seat 14 and the second-row passenger-side seat 18, and transmits a detection signal to the ECU 26.

If the ECU 26 determines that at least one of the second-row driver-side seat 14 and the second-row passenger-side seat 18 needs to be swiveled to the inward-oriented position, for example, because the occupant in the child seat needs to be taken care of based on detection signals from the microphone and the camera of the occupant condition detection sensor 24, the ECU 26 transmits a control signal indicating a command to swivel the seat from the frontward-oriented position to the inward-oriented position to at least one of the motor drive units 30 and 34 as appropriate.

Thus, at least one of the second-row driver-side seat 14 and the second-row passenger-side seat 18, which needs to be swiveled to the inward-oriented position (toward the child seat), is automatically swiveled to the inward-oriented position. Thus, at least one of the occupants seated in the second-row driver-side seat 14 and the second-row passenger-side seat 18 can access the occupant in the child seat more easily.

As described above in detail, with the automobile seat apparatus 10 according to the embodiment of the invention, at least one of the second-row driver-side seat 14 and the second-row passenger-side seat 18 is automatically swiveled to the appropriate position based on the conditions of the occupants seated in the second-row driver-side seat 14 and the second-row passenger-side seat 18. Thus, the usability of the second-row driver-side seat 14 and the second-row passenger-side seat 18 is enhanced. As a result, it is possible to further increase the comfort of the passenger compartment.

While the invention has been described with reference to the example embodiment thereof, the invention is not limited to the example embodiment. To the contrary, the invention is intended to cover various modifications within a scope of the invention.

For example, in the embodiment of the invention described above, the conditions of the occupants such as the atmosphere in the passenger compartment (whether the occupants are communicating with each other), the arousal levels (sleepiness) of the occupants, the physical conditions of the occupants (whether each occupant gets a motion sickness), the condition of communication between each occupant and a person outside the passenger compartment (whether each occupant is communicating with a person outside the passenger compartment), the smoking condition (whether at least one occupant is smoking), the quarreling condition (whether the occupants quarrel), the eating condition, and the child seat occupant condition are detected. However, other conditions of the occupants may be detected.

In the embodiment of the invention described above, the conditions outside the passenger compartment such as the level of noise outside the passenger compartment, whether the automobile is traveling in the daytime or at night, the brightness outside the passenger compartment are detected. Alternatively, other conditions outside the passenger compartment may be detected.

Figure 10:
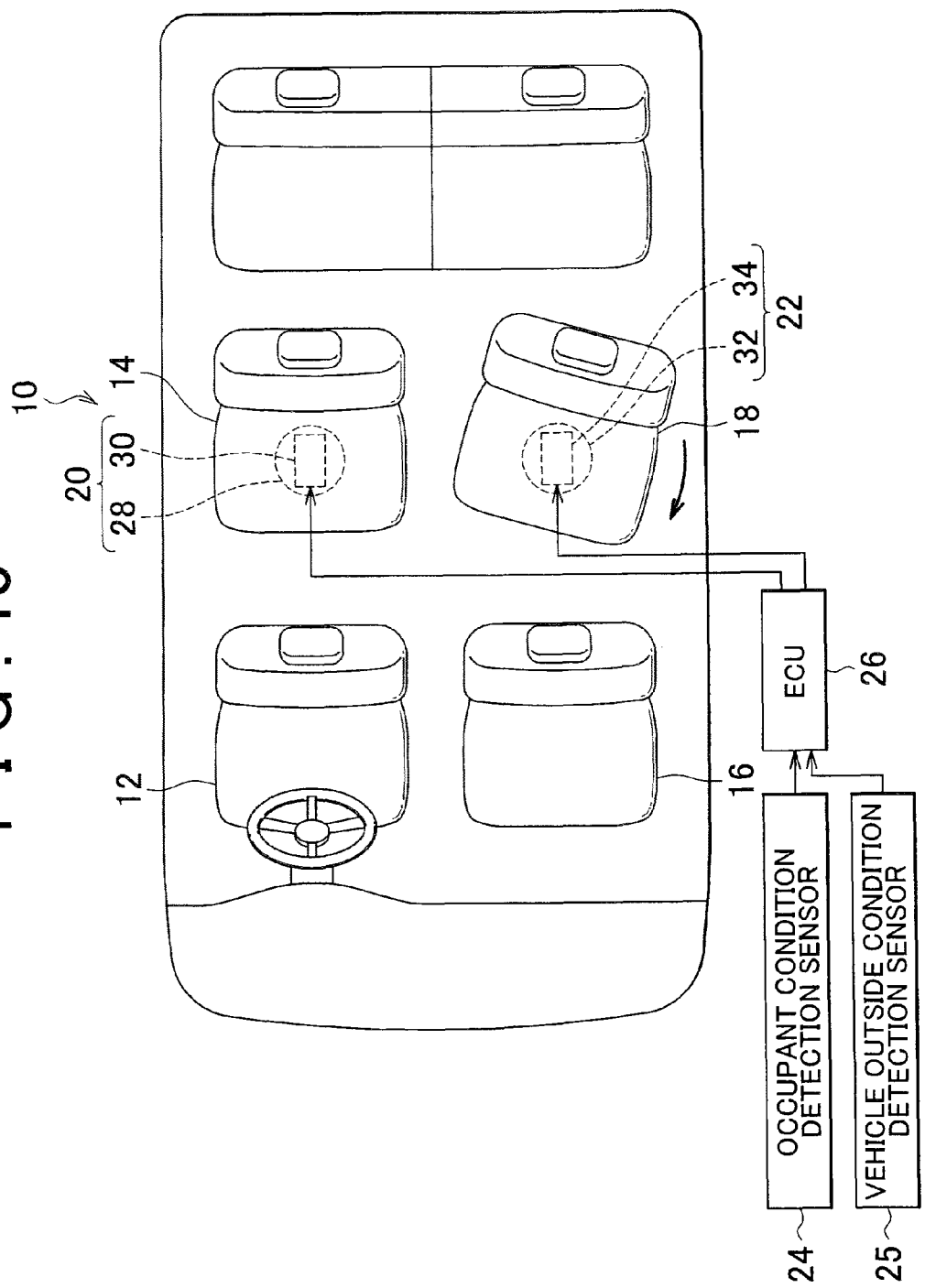
FIG. 10 is a view showing the automobile seat apparatus according to a modification of the embodiment of the invention.

In the embodiment of the invention described above, when the occupants seated in the second-row driver-side seat 14 and the second-row passenger-side seat 18 are communicating with each other, the second-row driver-side seat 14 and the second-row passenger-side seat 18 are swiveled to the inward-oriented positions. Alternatively, as shown in FIGS. 10 and 11, one of the second-row driver-side seat 14 and the second-row passenger-side seat 18 may be swiveled to the inward-oriented position.

In the embodiment of the invention described above, when the occupants seated in the second-row driver-side seat 14 and the second-row passenger-side seat 18 are not communicating with each other, the second-row driver-side seat 14 and the second-row passenger-side seat 18 are swiveled to the outward-oriented positions. Alternatively, as shown in FIGS. 4 and 5, one of the second-row driver-side seat 14 and the second-row passenger-side seat 18 may be swiveled to the outward-oriented position.

In the embodiment of the invention described above, the automobile seat apparatus 10 includes the second-row driver-side seat 14 and the second-row passenger-side seat 18. Alternatively, as shown in FIGS. 12 and 13, the automobile seat apparatus 10 may include the passenger seat 16, the second-row driver-side seat 14 and the second-row passenger-side seat 18. The passenger seat 16 is provided with a swiveling drive mechanism 50 that includes a swiveling support unit 52 and a motor drive unit 54. The swiveling drive mechanism 50 is similar to the swiveling drive mechanism 20 of the second-row driver-side seat 14 and the swiveling drive mechanism 22 of the second-row passenger-side seat 18.

In this case, when the occupants seated in the passenger seat 16, the second-row driver-side seat 14 and the second-row passenger-side seat 18 are communicating with each other, as shown in FIG. 12, all the passenger seat 16, the second-row driver-side seat 14 and the second-row passenger-side seat 18 may be swiveled to the inward-oriented positions.

On the other hand, when the occupants seated in the passenger seat 16, the second-row driver-side seat 14 and the second-row passenger-side seat 18 are not communicating with each other, as shown in FIG. 13, all the passenger seat 16, the second-row driver-side seat 14 and the second-row passenger-side seat 18 may be swiveled to the outward-oriented positions.

When the occupants seated in the passenger seat 16, the second-row driver-side seat 14 and the second-row passenger-side seat 18 are communicating with each other, only one of the passenger seat 16, the second-row driver-side seat 14 and the second-row passenger-side seat 18 may be swiveled to the inward-oriented position.

On the other hand, when the occupants seated in the passenger seat 16, the second-row driver-side seat 14 and the second-row passenger-side seat 18 are not communicating with each other, only one of the passenger seat 16, the second-row driver-side seat 14 and the second-row passenger-side seat 18 may be swiveled to the outward-oriented position.

When one of the occupants seated in the passenger seat 16, the second-row driver-side seat 14 and the second-row passenger-side seat 18 feels sleepy or feels sick, is communicating with a person outside the passenger compartment, is smoking or quarreling, or has a meal alone, only the seat which is occupied by this occupant may be swiveled to the outward-oriented position.

When it is noisy outside the passenger compartment, when the automobile is traveling at night, or when it is dark outside the passenger compartment, only one of the passenger seat 16, the second-row driver-side seat 14 and the second-row passenger-side seat 18 may be swiveled to the inward-oriented position.

In the embodiment of the invention described above, the automobile seat apparatus 10 may include at least one of the passenger seat 16, the second-row driver-side seat 14 and the second-row passenger-side seat 18.

In this case, when one of the occupants seated in the passenger seat 16, the second-row driver-side seat 14 and the second-row passenger-side seat 18 is communicating with another occupant, only one of the passenger seat 16, the second-row driver-side seat 14 and the second-row passenger-side seat 18, which is occupied by the occupant who is communicating with the other occupant, may be swiveled to the inward-oriented position.

On the other hand, when the occupants seated in the passenger seat 16, the second-row driver-side seat 14 and the second-row passenger-side seat 18 are not communicating with each other, only one of the passenger seat 16, the second-row driver-side seat 14 and the second-row passenger-side seat 18 may be swiveled to the outward-oriented position.

When one of the occupants seated in the passenger seat 16, the second-row driver-side seat 14 and the second-row passenger-side seat 18 feels sleepy or feels sick, is communicating with a person outside the passenger compartment, is smoking or quarreling, or has a meal alone, only one of the passenger seat 16, the second-row driver-side seat 14 and the second-row passenger-side seat 18, which is occupied by this occupant, may be swiveled to the outward-oriented position.

When it is noisy outside the passenger compartment, when the automobile is traveling at night, or when it is dark outside the passenger compartment, only one of the passenger sat 16, the second-row driver-side seat 14 and the second-row passenger-side seat 18 may be swiveled to the inward-oriented position.

In the embodiment of the invention described above, the automobile seat apparatus 10 includes the second-row driver-side seat 14 and the second-row passenger-side seat 18. Alternatively, the automobile seat apparatus 10 may include the passenger seat 16, the second-row driver-side seat 14, the second-row passenger-side seat 18, a third-row driver-side seat 56, and a third-row passenger-side seat 58.

In this case, when the occupants seated in the passenger seat 16, the second-row driver-side seat 14, the second-row passenger-side seat 18, the third-row driver-side seat 56 and the third-row passenger-side seat 58 are communicating with each other, all the passenger seat 16, the second-row driver-side seat 14, the second-row passenger-side seat 18, the third-row driver-side seat 56 and the third-row passenger-side seat 58 may be swiveled to the inward-oriented positions.

On the other hand, when the occupants seated in the passenger seat 16, the second-row driver-side seat 14, the second-row passenger-side seat 18, the third-row driver-side seat 56 and the third-row passenger-side seat 58 are not communicating with each other, all the passenger seat 16, the second-row driver-side seat 14, the second-row passenger-side seat 18, the third-row driver-side seat 56 and the third-row passenger-side seat 58 may be swiveled to the outward-oriented positions.

When the occupants seated in the passenger seat 16, the second-row driver-side seat 14, the second-row passenger-side seat 18, the third-row driver-side seat 56 and the third-row passenger-side seat 58 are communicating with each other, only one of the passenger seat 16, the second-row driver-side seat 14, the second-row passenger-side seat 18, the third-row driver-side seat 56 and the third-row passenger-side seat 58 may be swiveled to the inward-oriented position.

On the other hand, when the occupants seated in the passenger seat 16, the second-row driver-side seat 14, the second-row passenger-side seat 18, the third-row driver-side seat 56 and the third-row passenger-side seat 58 are not communicating with each other, only one of the passenger seat 16, the second-row driver-side seat 14, the second-row passenger-side seat 18, the third-row driver-side seat 56 and the third-row passenger-side seat 58 may be swiveled to the outward-oriented position.

When one of the occupants seated in the passenger seat 16, the second-row driver-side seat 14, the second-row passenger-side seat 18, the third-row driver-side seat 56 and the third-row passenger-side seat 58 feels sleepy or feels sick, is communicating with a person outside the passenger compartment, is smoking or quarreling, or has a meal alone, only the seat which is occupied by this occupant may be swiveled to the outward-oriented position.

When it is noisy outside the passenger compartment, when the automobile is traveling at night, or when it is dark outside the passenger compartment, only one of the passenger seat 16, the second-row driver-side seat 14, the second-row passenger-side seat 18, the third-row driver-side seat 56 and the third-row passenger-side seat 58 may be swiveled to the outward-oriented position.

In the embodiment of the invention described above, the conditions of the occupants seated in the second-row driver-side seat 14 and the second-row passenger-side seat 18 are detected and at least one of the second-row driver-side seat 14 and the second-row passenger-side seat 18 is swiveled. Alternatively, for example, in the atmosphere detection mode, the condition of the occupant seated in the second-row driver-side seat 14 may be detected and the second-row passenger-side seat 18 may be swiveled as appropriate. Further alternatively, the condition of the occupant seated in the second-row passenger-side seat 18 may be detected and the second-row driver-side seat 14 may be swiveled as appropriate.

In the embodiment of the invention described above, the automobile seat apparatus 10 may include the second-row driver-side seat 14 and the second-row passenger-side seat 18. Alternatively, the automobile seat apparatus 10 may include only one of the second-row driver-side seat 14 and the second-row passenger-side seat 18.

In the embodiment of the invention described above, in the automobile seat apparatus 10, the third-row driver-side seat 56 and the third-row passenger-side seat 58 may be swiveled as appropriate instead of the second-row driver-side seat 14 and the second-row passenger-side seat 18.

In the embodiment of the invention described above, the automobile seat apparatus 10 is mounted in a passenger automobile, for example, a mini-van. Alternatively, the automobile seat apparatus 10 may be mounted in other vehicles, for example, automobiles such as a minibus and a motorcoach, a railroad vehicle, a passenger airplane, and a marine vessel.

In the embodiment of the invention described above, the mode of the ECU 26 is switched among the atmosphere detection mode, the sleepiness detection mode, the physical condition detection mode, the passenger compartment outside communication detection mode, the smoking detection mode, the quarreling detection mode, the eating condition detection mode, the cellular phone usage detection mode, the passenger compartment outside condition detection mode, and child seat occupant condition detection mode, based on, for example, command signals from the mode selection switch provided in the passenger compartment and a preset algorithm. Alternatively, the following configuration may be employed.

The above-described modes may be prioritized in advance. Even when the ECU 26 executes the control in one of the modes, if the ECU 26 receives an occupant condition detection signal related to another mode having higher priority, the ECU 26 may executes the control related to this mode having higher priority in an interrupt manner.

In the embodiment of the invention described above, when the occupants seated in the second-row driver-side seat 14 and the second-row passenger-side seat 18 are communicating with each other in the atmosphere detection mode, the second-row driver-side seat 14 and the second-row passenger-side seat 18 are swiveled from the outward-oriented positions or the frontward-oriented positions to the inward-oriented positions. Alternatively, the second-row driver-side seat 14 and the second-row passenger-side seat 18 may be swiveled from the outward-oriented positions to the frontward-oriented positions.

In the embodiment of the invention described above, if it is determined in the sleepiness detection mode that at least one of the occupants seated in the second-row driver-side seat 14 and the second-row passenger-side seat 18 feels sleepy, the seat which is occupied by the occupant who feels sleepy is swiveled from the frontward-oriented position to the outward-oriented position. Alternatively, this seat may be swiveled from the inward-oriented position to the outward-oriented position. Further alternatively, this seat may be swiveled from the inward-oriented position to the frontward-oriented position.

In the embodiment of the invention described above, if it is determined in the physical condition detection mode that at least one of the occupants seated in the second-row driver-side seat 14 and the second-row passenger-side seat 18 feels sick, the seat which is occupied by the occupant who feels sick is swiveled from the frontward-oriented position to the outward-oriented position. Alternatively, this seat may be swiveled from the inward-oriented position to the outward-oriented position. Further alternatively, this seat may be swiveled from the inward-oriented position to the frontward-oriented position.

In the embodiment of the invention described above, if it is determined in the passenger compartment outside communication detection mode that at least one of the occupants seated in the second-row driver-side seat 14 and the second-row passenger-side seat 18 is communicating with a person outside the passenger compartment, the seat which is occupied by the occupant who is communicating with the person outside the passenger compartment is swiveled from the frontward-oriented position to the outward-oriented position. Alternatively, this seat may be swiveled from the inward-oriented position to the outward-oriented position. Further alternatively, this seat may be swiveled from the inward-oriented position to the frontward-oriented position.

In the embodiment of the invention described above, if it is determined in the smoking detection mode that at least one of the occupants seated in the second-row driver-side seat 14 and the second-row passenger-side seat 18 is smoking, the seat which is occupied by the occupant who is smoking is swiveled from the frontward-oriented position to the outward-oriented position. Alternatively, this seat may be swiveled from the inward-oriented position to the outward-oriented position. Further alternatively, this seat may be swiveled from the inward-oriented position to the frontward-oriented position.

In the embodiment of the invention described above, if it is determined in the quarreling detection mode that at least one of the occupants seated in the second-row driver-side seat 14 and the second-row passenger-side seat 18 is quarreling, the seat which is occupied by the occupant who is quarreling is swiveled from the frontward-oriented position to the outward-oriented position. Alternatively, this seat may be swiveled from the inward-oriented position to the outward-oriented position. Further alternatively, this seat may be swiveled from the inward-oriented position to the frontward-oriented position.

In the embodiment of the invention described above, if it is determined in the passenger compartment outside condition detection mode that the condition outside the passenger compartment is unsuitable for maintaining at least one of the second-row driver-side seat 14 and the second-row passenger-side seat 18 in the outward-oriented position, at least one of the second-row driver-side seat 14 and the second-row passenger-side seat 18 is swiveled from the outward-oriented position to the inward-oriented position as appropriate. Alternatively, at least one of the second-row driver-side seat 14 and the second-row passenger-side seat 18 may be swiveled from the outward-oriented position to the frontward-oriented position as appropriate.

In the embodiment of the invention described above, if it is determined in the eating condition detection mode that at least one of the occupants seated in the second-row driver-side seat 14 and the second-row passenger-side seat 18 has a meal alone, the seat which is occupied by the occupant who has a meal alone is swiveled from the frontward-oriented position to the outward-oriented position. Alternatively, this seat may be swiveled from the inward-oriented position to the outward-oriented position. Further alternatively, this seat may be swiveled from the inward-oriented position to the frontward-oriented position.

In the embodiment of the invention described above, if it is determined in the eating condition detection mode that at least one of the occupants seated in the second-row driver-side seat 14 and the second-row passenger-side seat 18 has a meal with another occupant in the passenger compartment, the seat which is occupied by the occupant who has a meal with the other occupant is swiveled from the frontward-oriented position to the inward-oriented position. Alternatively, this seat may be swiveled from the outward-oriented position to the inward-oriented position. Further alternatively, this seat may be swiveled from the outward-oriented position to the inward-oriented position.

In the embodiment of the invention described above, if it is determined in the child seat occupant condition detection mode that at least one of the second-row driver-side seat 14 and the second-row passenger-side seat 18 needs to be swiveled to the inward-oriented position, the seat that needs to be swiveled to the inward-oriented position is swiveled from the frontward-oriented position to the inward-oriented position. Alternatively, this seat may be swiveled from the outward-oriented position to the inward-oriented position. Further alternatively, this seat may be swiveled from the outward-oriented position to the frontward-oriented position.

In the embodiment of the invention described above, if it is determined in the smoking detection mode that at least one of the occupants seated in the second-row driver-side seat 14 and the second-row passenger-side seat 18 is smoking, the seat which is occupied by the occupant who is smoking is swiveled to the outward-oriented position. Alternatively, the following operations may be performed.

It may be determined whether an occupant other than the occupants seated in the second-row driver-side seat 14 and the second-row passenger-side seat 18 is smoking. If it is determined that an occupant other than the occupants seated in the second-row driver-side seat 14 and the second-row passenger-side seat 18 is smoking, at least one of the second-row driver-side seat 14 and the second-row passenger-side seat 18 may be swiveled to the outward-oriented position.

Thus, when an occupant other than the occupants seated in the second-row driver-side seat 14 and the second-row passenger-side seat 18 is smoking, at least one of the occupants seated in the second-row driver-side seat 14 and the second-row passenger-side seat 18 is kept away from the smoke.

In the embodiment of the invention described above, if it is determined in the quarreling detection mode that at least one of the occupants seated in the second-row driver-side seat 14 and the second-row passenger-side seat 18 is quarreling, the seat which is occupied by the occupant who is quarreling is swiveled to the outward-oriented position. Alternatively, the following operations may be performed.

It may be determined whether an occupant other than the occupants seated in the second-row driver-side seat 14 and the second-row passenger-side seat 18 is quarreling. If it is determined that an occupant other than the occupants seated in the second-row driver-side seat 14 and the second-row passenger-side seat 18 is quarreling, at least one of the second-row driver-side seat 14 and the second-row passenger-side seat 18 may be swiveled from the frontward-oriented position to the outward-oriented position (that is, the position at which the occupant seated in this seat gives his/her back to the quarrel).

In this way, when the occupant other than the occupants seated in the second-row driver-side seat 14 and the second-row passenger-side seat 18 is quarreling, at least one of the occupants seated in the second-row driver-side seat 14 and the second-row passenger-side seat 18 is prevented from feeling annoyed by the quarrel.

In the embodiment of the invention described above, the second-row driver-side seat 14 and the second-row passenger-side seat 18 are automatically swiveled based on the conditions of the occupants and the condition outside the passenger compartment. In addition to this, the configuration in which an occupant is able to selectively swivel the second-row driver-side seat 14 and the second-row passenger-side seat 18 to a selected position may be employed.

While the invention has been described with reference to the example embodiment thereof, it is to be understood that the invention is not limited to the example embodiment or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the scope of the invention.

What is claimed is:

1. A vehicle seat apparatus, comprising:
    a vehicle seat;
    a swiveling drive unit that swivels the vehicle seat between a frontward-oriented position in which the vehicle seat faces a front of a vehicle and at least one of an outward-oriented position in which the vehicle seat is oriented in an outward direction of the vehicle and an inward-oriented position in which the vehicle seat is oriented in an inward direction of the vehicle;
    an occupant condition detection unit that detects a condition of an occupant in the vehicle; and
    a control unit that controls the swiveling drive unit based on a detection result obtained by the occupant condition detection unit;
    wherein the condition of the occupant in the vehicle detected by the occupant condition detection unit includes at least one of a condition of communication between an occupant seated in the vehicle seat and a person outside the vehicle, a condition of communication between the occupant seated in the vehicle seat and another occupant in the vehicle, a condition of whether a personal space needs to be provided to the occupant seated in the vehicle seat, a condition of whether the occupant seated in the vehicle seat has a meal alone, and a condition of an occupant seated in a child seat that is attached to a seat other than the vehicle seat.

2. The vehicle seat apparatus according to claim 1, wherein:
    the swiveling drive unit is able to swivel the vehicle seat toward the outward-oriented position;
    the occupant condition detection unit detects the condition of communication between the occupant seated in the vehicle seat and the person outside the vehicle; and
    the control unit controls the swiveling drive unit so that the vehicle seat is swiveled toward the outward-oriented position, when the control unit determines that the occupant seated in the vehicle seat is communicating with the person outside the vehicle based on the detection result obtained by the occupant condition detection unit.

3. The vehicle seat apparatus according to claim 1, wherein:
    the swiveling drive unit is able to swivel the vehicle seat toward the inward-oriented position;
    the occupant condition detection unit detects the condition of communication between the occupant seated in the vehicle seat and the other occupant in the vehicle; and
    the control unit controls the swiveling drive unit so that the vehicle seat is swiveled toward the inward-oriented position, when the control unit determines that the occupant seated in the vehicle seat is communicating with the other occupant in the vehicle based on the detection result obtained by the occupant condition detection unit.

4. The vehicle seat apparatus according to claim 3, wherein:
    the swiveling drive unit is able to swivel the vehicle seat toward the outward-oriented position; and
    the control unit controls the swiveling drive unit so that the vehicle seat is swiveled toward the outward-oriented position, when the control unit determines that the occupant seated in the vehicle seat is not communicating with the other occupant in the vehicle based on the detection result obtained by the occupant condition detection unit.

5. The vehicle seat apparatus according to claim 1, wherein:
    the swiveling drive unit is able to swivel the vehicle seat toward the outward oriented position;
    the occupant condition detection unit detects whether the personal space needs to be provided to the occupant seated in the vehicle seat; and
    the control unit controls the swiveling drive unit so that the vehicle seat is swiveled toward the outward-oriented position, when the control unit determines that the personal space needs to be provided to the occupant seated in the vehicle seat based on the detection result obtained by the occupant condition detection unit.

6. The vehicle seat apparatus according to claim 5, wherein:
    the occupant condition detection unit detects an arousal level of the occupant seated in the vehicle seat; and
    the control unit controls the swiveling drive unit so that the vehicle seat is swiveled toward the outward-oriented position, when the control unit determines that the arousal level of the occupant seated in the vehicle seat has been decreased based on the detection result obtained by the occupant condition detection unit.

7. The vehicle seat apparatus according to claim 5, wherein:
the occupant condition detection unit detects a physical condition of the occupant seated in the vehicle seat; and
the control unit controls the swiveling drive unit so that the vehicle seat is swiveled toward the outward-oriented position, when the control unit determines that the occupant seated in the vehicle seat feels sick based on the detection result obtained by the occupant condition detection unit.

8. The vehicle seat apparatus according to claim 5, wherein:
the occupant condition detection unit detects whether at least one occupant in the vehicle is smoking; and
the control unit controls the swiveling drive unit so that the vehicle seat is swiveled toward the outward-oriented position, when the control unit determines that an occupant in the vehicle is smoking based on the detection result obtained by the occupant condition detection unit.

9. The vehicle seat apparatus according to claim 5, wherein:
the occupant condition detection unit detects whether occupants in the vehicle are quarreling; and
the control unit controls the swiveling drive unit so that the vehicle seat is swiveled toward the outward-oriented position, when the control unit determines that the occupants in the vehicle are quarreling based on the detection result obtained by the occupant condition detection unit.

10. The vehicle seat apparatus according to claim 5, wherein:
the occupant condition detection unit detects whether the occupant seated in the vehicle seat has the meal alone; and
the control unit controls the swiveling drive unit so that the vehicle seat is swiveled toward the outward-oriented position, when the control unit determines that the occupant seated in the vehicle seat has the meal alone based on the detection result obtained by the occupant condition detection unit.

11. The vehicle seat apparatus according to claim 5, wherein:
the occupant condition detection unit detects whether the occupant seated in the vehicle seat is using a cellular phone; and
the control unit controls the swiveling drive unit so that the vehicle seat is swiveled toward the outward-oriented position, when the control unit determines that the occupant seated in the vehicle seat is using the cellular phone based on the detection result obtained by the occupant condition detection unit.

12. A vehicle seat apparatus, comprising:
a vehicle seat;
a swiveling drive unit that swivels the vehicle seat between a frontward-oriented position in which the vehicle seat faces a front of a vehicle and at least one of an outward-oriented position in which the vehicle seat is oriented in an outward direction of the vehicle and an inward-oriented position in which the vehicle seat is oriented in an inward direction of the vehicle;
an occupant condition detection unit that detects a condition of an occupant in the vehicle;
a control unit that controls the swiveling drive unit based on a detection result obtained by the occupant condition detection unit; and
a vehicle outside condition detection unit that detects a condition outside the vehicle, wherein
the swiveling drive unit is able to swivel the vehicle seat toward the inward-oriented position, and
the control unit controls the swiveling drive unit so that the vehicle seat is swiveled from the frontward-oriented position or the outward-oriented position toward the inward-oriented position, when the control unit determines that the condition outside the vehicle is unsuitable for maintaining the vehicle seat in the frontward-oriented position or the outward-oriented position based on the detection result obtained by the vehicle outside condition detection unit.

13. The vehicle seat apparatus according to claim 12, wherein:
the vehicle outside condition detection unit detects whether it is noisy outside the vehicle; and
the control unit controls the swiveling drive unit so that the vehicle seat is swiveled from the frontward-oriented position or the outward-oriented position toward the inward-oriented position, when the control unit determines that it is noisy outside the vehicle based on the detection result obtained by the vehicle outside condition detection unit.

14. The vehicle seat apparatus according to claim 12, wherein:
the vehicle outside condition detection unit detects whether the vehicle is traveling in a daytime or at night; and
the control unit controls the swiveling drive unit so that the vehicle seat is swiveled from the frontward-oriented position or the outward-oriented position toward the inward-oriented position, when the control unit determines that the vehicle is traveling at night based on the detection result obtained by the vehicle outside condition detection unit.

15. The vehicle seat apparatus according to claim 12, wherein:
the vehicle outside condition detection unit detects brightness outside the vehicle; and
the control unit controls the swiveling drive unit so that the vehicle seat is swiveled from the frontward-oriented position or the outward-oriented position toward the inward-oriented position, when the control unit determines that the brightness outside the vehicle is equal to or lower than a predetermined reference value based on the detection result obtained by the vehicle outside condition detection unit.

16. The vehicle seat apparatus according to claim 1, wherein:
the swiveling drive unit is able to swivel the vehicle seat toward the inward-oriented position;
the occupant condition detection unit detects whether the occupant seated in the vehicle seat has the meal alone; and
the control unit controls the swiveling drive unit so that the vehicle seat is swiveled toward the inward-oriented position, when the control unit determines that the occupant seated in the vehicle seat has the meal with another occupant in the vehicle based on the detection result obtained by the occupant condition detection unit.

17. The vehicle seat apparatus according to claim 1, wherein:

the swiveling drive unit is able to swivel the vehicle seat toward the inward-oriented position;

the occupant condition detection unit detects the condition of the occupant seated in the child seat that is attached to the seat other than the vehicle seat; and the control unit controls the swiveling drive unit so that the vehicle seat is swiveled toward the inward-oriented position, when the control unit determines that the vehicle seat needs to be swiveled toward the inward-oriented position based on the detection result obtained by the occupant condition detection unit.

18. A vehicle seat apparatus, comprising:

at least a pair of vehicle seats arranged next to each other in a width-direction of a vehicle;

a swiveling drive unit that swivels at least one of the pair of vehicle seats between a frontward-oriented position in which the vehicle seat faces a front of the vehicle and at least one of an outward-oriented position in which the vehicle seat is oriented in an outward direction of the vehicle and an inward-oriented position in which the vehicle seat is oriented in an inward direction of the vehicle;

an occupant condition detection unit that detects a condition of an occupant in the vehicle; and a control unit that controls the swiveling drive unit based on a detection result obtained by the occupant condition detection unit;

wherein the condition of the occupant in the vehicle detected by the occupant condition detection unit includes at least one of a condition of communication between an occupant seated in one of the pair of vehicle seats and a person outside the vehicle, a condition of communication between occupants seated in the pair of vehicle seats, a condition of whether a personal space needs to be provided to the occupant seated in one of the pair of vehicle seats, a condition of whether the occupant seated in one of the pair of vehicle seats has a meal alone, and a condition of an occupant seated in a child seat that is attached to one of the pair of vehicle seats or a seat other than the pair of vehicle seats.

19. The vehicle seat apparatus according to claim 18, wherein:

the swiveling drive unit is able to swivel at least one of the pair of vehicle seats toward the outward-oriented position;

the occupant condition detection unit detects the condition of communication between the occupant seated in one of the pair of vehicle seats and the person outside the vehicle; and when the control unit determines that the occupant seated in one of the pair of vehicle seats is communicating with the person outside the vehicle based on the detection result obtained by the occupant condition detection unit, the control unit controls the swiveling drive unit so that the vehicle seat occupied by the occupant who is communicating with the person outside vehicle seat is swiveled toward the outward-oriented position.

20. The vehicle seat apparatus according to claim 18, wherein:

the swiveling drive unit is able to swivel at least one of the pair of vehicle seats toward the inward-oriented position;

the occupant condition detection unit detects the condition of communication between occupants seated in the pair of vehicle seats; and when the control unit determines that the occupants seated in the pair of vehicle seats are communicating with each other based on the detection result obtained by the occupant condition detection unit, the control unit controls the swiveling drive unit so that at least one of the pair of vehicle seats is swiveled toward the inward-oriented position.

21. The vehicle seat apparatus according to claim 20, wherein:

the swiveling drive unit is able to swivel at least one of the pair of vehicle seats toward the outward-oriented position; and when the control unit determines that the occupants seated in the pair of vehicle seats are not communicating with each other based on the detection result obtained by the occupant condition detection unit, the control unit controls the swiveling drive unit so that at least one of the pair of vehicle seats is swiveled toward the outward-oriented position.

22. The vehicle seat apparatus according to claim 18, wherein:

the swiveling drive unit is able to swivel at least one of the pair of vehicle seats toward the outward-oriented position;

the occupant condition detection unit detects whether the personal space needs to be provided to the occupant seated in one of the pair of vehicle seats; and when the control unit determines based on the detection result obtained by the occupant condition detection unit that the personal space needs to be provided to the occupant seated in one of the pair of vehicle seats, the control unit controls the swiveling drive unit so that the vehicle seat occupied by the occupant who needs to be provided with the personal space is swiveled toward the outward-oriented position.

23. The vehicle seat apparatus according to claim 22, wherein:

the occupant condition detection unit detects an arousal level of the occupant seated in one of the pair of vehicle seats; and when the control unit determines that the arousal level of the occupant seated in one of the pair of vehicle seats has been decreased based on the detection result obtained by the occupant condition detection unit, the control unit controls the swiveling drive unit so that the vehicle seat occupied by the occupant who feels sleepy is swiveled toward the outward-oriented position.

24. The vehicle seat apparatus according to claim 22, wherein:

the occupant condition detection unit detects a physical condition of the occupant seated in one of the pair of vehicle seats; and when the control unit determines that the occupant seated in one of the pair of vehicle seats feels sick based on the detection result obtained by the occupant condition detection unit, the control unit controls the swiveling drive unit so that the vehicle seat occupied by the occupant who feels sick is swiveled toward the outward-oriented position.

25. The vehicle seat apparatus according to claim 22, wherein:

the occupant condition detection unit detects whether at least one occupant in the vehicle is smoking; and when the control unit determines that an occupant in the vehicle is smoking based on the detection result obtained by the occupant condition detection unit, the control unit controls the swiveling drive unit so that at least one of the pair of vehicle seats is swiveled toward the outward-oriented position.

26. The vehicle seat apparatus according to claim 22, wherein:
- the occupant condition detection unit detects whether occupants in the vehicle are quarreling; and
- when the control unit determines that the occupants in the vehicle are quarreling based on the detection result obtained by the occupant condition detection unit, the control unit controls the swiveling drive unit so that at least one of the pair of vehicle seats is swiveled toward the outward-oriented position.

27. The vehicle seat apparatus according to claim 22, wherein:
- the occupant condition detection unit detects whether the occupant seated in one of the pair of vehicle seats has the meal alone; and
- when the control unit determines that the occupant seated in one of the pair of vehicle seats has the meal alone based on the detection result obtained by the occupant condition detection unit, the control unit controls the swiveling drive unit so that the vehicle seat which is occupied by the occupant who has the meal alone is swiveled toward the outward-oriented position.

28. The vehicle seat apparatus according to claim 22, wherein:
- the occupant condition detection unit detects whether the occupant seated in one of the pair of vehicle seats is using a cellular phone; and
- when the control unit determines that the occupant seated in one of the pair of vehicle seats is using the cellular phone based on the detection result obtained by the occupant condition detection unit, the control unit controls the swiveling drive unit so that the vehicle seat which is occupied by the occupant who is using the cellular phone is swiveled toward the outward-oriented position.

29. A vehicle seat apparatus, comprising:
- at least a pair of vehicle seats arranged next to each other in a width-direction of a vehicle;
- a swiveling drive unit that swivels at least one of the pair of vehicle seats between a frontward-oriented position in which the vehicle seat faces a front of the vehicle and at least one of an outward-oriented position in which the vehicle seat is oriented in an outward direction of the vehicle and an inward-oriented position in which the vehicle seat is oriented in an inward direction of the vehicle;
- an occupant condition detection unit that detects a condition of an occupant in the vehicle;
- a control unit that controls the swiveling drive unit based on a detection result obtained by the occupant condition detection unit; and
- a vehicle outside condition detection unit that detects a condition outside the vehicle, wherein
- the swiveling drive unit is able to swivel at least one of the pair of vehicle seats toward the inward-oriented position; and
- when the control unit determines based on the detection result obtained by the vehicle outside condition detection unit that the condition outside the vehicle is unsuitable for keeping an occupant seated in one of the pair of vehicle seats, which is in the frontward-oriented position or the outward-oriented position, the control unit controls the swiveling drive unit so that the vehicle seat which is occupied by the occupant for whom the condition outside the vehicle is unsuitable is swiveled from the frontward-oriented position or the outward-oriented position toward the inward-oriented position.

30. The vehicle seat apparatus according to claim 29, wherein:
- the vehicle outside condition detection unit detects whether it is noisy outside the vehicle; and
- when the control unit determines that it is noisy outside the vehicle based on the detection result obtained by the vehicle outside condition detection unit, the control unit controls the swiveling drive unit so that at least one of the pair of vehicle seats is swiveled from the frontward-oriented position or the outward-oriented position toward the inward-oriented position.

31. The vehicle seat apparatus according to claim 29, wherein:
- the vehicle outside condition detection unit detects whether the vehicle is traveling in a daytime or at night; and
- when the control unit determines that the vehicle is traveling at night based on the detection result obtained by the vehicle outside condition detection unit, the control unit controls the swiveling drive unit so that at least one of the pair of vehicle seats is swiveled from the frontward-oriented position or the outward-oriented position toward the inward-oriented position.

32. The vehicle seat apparatus according to claim 29, wherein:
- the vehicle outside condition detection unit detects brightness outside the vehicle; and
- when the control unit determines that the brightness outside the vehicle is equal to or lower than a predetermined reference value based on the detection result obtained by the vehicle outside condition detection unit, the control unit controls the swiveling drive unit so that at least one of the pair of vehicle seats is swiveled from the frontward-oriented position or the outward-oriented position toward the inward-oriented position.

33. The vehicle seat apparatus according to claim 18, wherein:
- the swiveling drive unit is able to swivel at least one of the pair of vehicle seats toward the inward-oriented position;
- the occupant condition detection unit detects whether the occupant seated in one of the pair of vehicle seats has the meal alone; and
- when the control unit determines that the occupant seated in one of the pair of vehicle seats has the meal with another occupant in the vehicle based on the detection result obtained by the occupant condition detection unit, the control unit controls the swiveling drive unit so that the vehicle seat occupied by the occupant who has the meal with the other occupant in the vehicle seat is swiveled toward the inward-oriented position.

34. The vehicle seat apparatus according to claim 18, wherein:
- the swiveling drive unit is able to swivel at least one of the pair of vehicle seats toward the inward-oriented position;
- the occupant condition detection unit detects the condition of the occupant seated in the child seat that is attached to one of the pair of vehicle seats or the seat other than the pair of vehicle seats; and
- when the control unit determines that one of the pair of vehicle seats needs to be swiveled toward the inward-oriented position based on the detection result obtained by the occupant condition detection unit, the control unit controls the swiveling drive unit so that the vehicle seat that needs to be swiveled toward the inward-oriented position is swiveled toward the inward-oriented position.

\* \* \* \* \*